(12) United States Patent
Maehara et al.

(10) Patent No.: US 8,104,562 B2
(45) Date of Patent: Jan. 31, 2012

(54) SADDLE-RIDING TYPE SMALL VEHICLE AND MOTORCYCLE

(75) Inventors: Hayato Maehara, Wako (JP); Yasushi Fujimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 12/259,757

(22) Filed: Oct. 28, 2008

(65) Prior Publication Data

US 2009/0107750 A1 Apr. 30, 2009

(30) Foreign Application Priority Data

Oct. 31, 2007 (JP) .................................. 2007-284439

(51) Int. Cl.
*B62K 11/00* (2006.01)
(52) U.S. Cl. ...... 180/219; 180/230; 477/166; 123/188.9
(58) Field of Classification Search .................. 180/219, 180/230; 477/166; 123/188.9
See application file for complete search history.

(56) References Cited

U.S. PATENT DOCUMENTS

| 4,923,027 A | * | 5/1990 | Hayashi et al. ............... 180/219 |
| 5,122,100 A | | 6/1992 | Carriere |
| 2008/0121454 A1 | * | 5/2008 | Oishi et al. .................... 180/219 |

FOREIGN PATENT DOCUMENTS

| CN | 2315308 Y | 4/1999 |
| JP | 2000-205301 A | 7/2000 |
| JP | 2003-232236 A | 8/2003 |

* cited by examiner

*Primary Examiner* — Tony H. Winner
*Assistant Examiner* — Jacob Knutson
(74) *Attorney, Agent, or Firm* — Westerman, Hattori, Daniels & Adrian, LLP

(57) ABSTRACT

There is provided a saddle-riding type small vehicle where a power unit is mounted on a vehicle body frame. The power unit includes a valve control device that controls the operation of valve-operation mode changing mechanisms capable of changing operation modes of engine valves, and a clutch control device that controls the operation of a clutch unit provided between a crankshaft and a shift mechanism so as to shift the connection/disconnection of power transmission. In the vehicle, the valve control device and the clutch control device are disposed to balance the center of gravity, so as to make a power unit compact. A valve control device and a clutch control device are disposed on left and right sides of a center line CB of a vehicle in a width direction of the vehicle.

6 Claims, 16 Drawing Sheets

SADDLE-RIDING TYPE SMALL VEHICLE AND MOTORCYCLE

TECHNICAL FIELD

The present invention relates to a saddle-riding type small vehicle and a motorcycle where a power unit including a valve system which is provided with valve-operation mode changing mechanisms for changing operation modes of engine valves, a clutch unit which is provided between a crankshaft and a shift mechanism so as to shift the connection/disconnection of power transmission, a valve control device which controls the operation of the valve-operation mode changing mechanisms, and a clutch control device which controls the operation of the clutch unit is mounted on a vehicle body frame.

BACKGROUND OF THE INVENTION

JP-A No. 2003-232236 discloses a vehicle that includes a hydraulic pressure control circuit for controlling the operation of a clutch of an automatic transmission and a valve-driving control device for controlling operation timing of engine valves.

Meanwhile, in a saddle-riding type small vehicle such as a motorcycle, the entire power unit needs to be made compact. Accordingly, there is a demand for the optimization of the disposition of a valve control device which controls the operation of a valve-operation mode changing mechanism and a clutch control device which shifts the connection/disconnection of a clutch unit.

SUMMARY OF THE INVENTION

The present invention has been made in consideration of the above-mentioned circumstances, and an object of the present invention is to provide a saddle-riding type small vehicle and a motorcycle where a valve control device and a clutch control device are disposed to balance the center of gravity, so as to make a power unit compact.

In order to achieve the above-mentioned object, a first aspect provides a saddle-riding type small vehicle where a power unit is mounted on a vehicle body frame. The power unit includes a valve system that is provided with valve-operation mode changing mechanisms for changing operation modes of engine valves, a clutch unit that is provided between a crankshaft and a shift mechanism so as to shift the connection/disconnection of power transmission, a valve control device that controls the operation of the valve-operation mode changing mechanisms, and a clutch control device that controls the operation of the clutch unit. The valve control device and the clutch control device are disposed on left and right sides of a center line of a vehicle in a width direction of the vehicle.

Further, a second aspect provides a motorcycle where a power unit is mounted on a vehicle body frame. The power unit includes a valve system that is provided with valve-operation mode changing mechanisms for changing operation modes of engine valves, a clutch unit which is provided between a crankshaft and a shift mechanism so as to shift the connection/disconnection of power transmission, a valve control device which controls the operation of the valve-operation mode changing mechanisms, and a clutch control device which controls the operation of the clutch unit. The valve control device and the clutch control device are disposed on left and right sides of a center line of a motorcycle in a width direction of the motorcycle, and are disposed on the inside of left and right straight lines that connect the outermost ends of footrests protruding toward the left and right sides in front view with a grounded portion of a front wheel in a front view.

A third aspect provides a saddle-riding type small vehicle where a power unit is mounted on a vehicle body frame. The power unit includes a valve system that is provided with valve-operation mode changing mechanisms for changing operation modes of engine valves, a clutch unit which is provided between a crankshaft and a shift mechanism so as to shift the connection/disconnection of power transmission, a valve control device which controls the operation of the valve-operation mode changing mechanisms, and a clutch control device which controls the operation of the clutch unit. The power unit is mounted on the vehicle body frame so that an axial direction of the crankshaft corresponds to the left and right direction of the vehicle. The valve control device and the clutch control device are disposed on left and right sides of a center line of the power unit in the left and right directions of the power unit.

Further, a fourth aspect, in addition to the structure of the third aspect, a single oil pump is commonly connected to the valve control device that controls the hydraulic pressure applied to the hydraulic valve-operation mode changing mechanisms for changing the operation modes of the engine valves, and to the clutch control device that controls the hydraulic pressure of the clutch unit for shifting the connection/disconnection of power transmission by hydraulic pressure. Furthermore, at least a part of oil passages that introduce hydraulic pressure from the oil pump is disposed in one of the valve control device, and the clutch control device to extend in the axial direction of the crankshaft.

Meanwhile, intake and exhaust valves of an embodiment correspond to the engine valves of the invention, a rear-bank valve system of an embodiment corresponds to the valve system of the invention, intake and exhaust valve-operation mode changing mechanisms of an embodiment correspond to the valve-operation mode changing mechanisms of the invention, a gear shift mechanism of an embodiment corresponds to the shift mechanism of the invention, a first oil pump of an embodiment corresponds to the oil pump of the invention, and a valve-moving hydraulic pressure control device of an embodiment corresponds to the valve control device of the invention.

According to the first aspect, the valve control device and the clutch control device are disposed on left and right sides of a center line of a vehicle in a width direction of the vehicle. Accordingly, the center of gravity of the power unit balances in the left and right direction, so that it is possible to make the power unit compact.

Further, according to the second aspect, the valve control device and the clutch control device are disposed on left and right sides of a center line of a motorcycle in a width direction of the motorcycle, and are disposed on the inside of left and right straight lines that connect the outermost ends of footrests protruding toward the left and right sides with a grounded portion of a front wheel in a front view. Accordingly, the center of gravity of the power unit balances in the left and right directions, so that it is possible to make the power unit compact and to protect the valve control device and the clutch control device by the footrests when the motorcycle is tilted toward the left or right side.

According to the third aspect, the power unit is mounted on the vehicle body frame so that an axial direction of the crankshaft corresponds to the left and right direction of the vehicle, and the valve control device and the clutch control device are disposed on left and right sides of a center line of the power unit in left and right directions of the power unit. Accordingly, the center of gravity of the power unit balances in the left and right direction, so that it is possible to make the power unit compact and to easily mount the power unit on the saddle-riding type small vehicle.

In addition, according to the fourth aspect, at least a part of oil passages, which introduce hydraulic pressure from the oil pump commonly connected to the valve control device and the clutch control device, is connected to one of the valve control device and the clutch control device, and extends in the axial direction of the crankshaft. Accordingly, it is possible to suppress the increase in the bulk of the power unit, and to make the hydraulic system, which is related to the hydraulic valve-operation mode changing mechanisms and the clutch unit, compact, thereby providing a power unit suitable for a saddle-riding type small vehicle and reducing an influence on the balance of the center of gravity by the disposition of the oil passage.

BRIEF DESCRIPTION OF THE DRAWINGS

An embodiment of the invention will be described below with reference to an example of the invention, which is shown in accompanying drawings. The advantages of the invention will become apparent in the following description taken in conjunction with the drawings, wherein.

Figure 1:
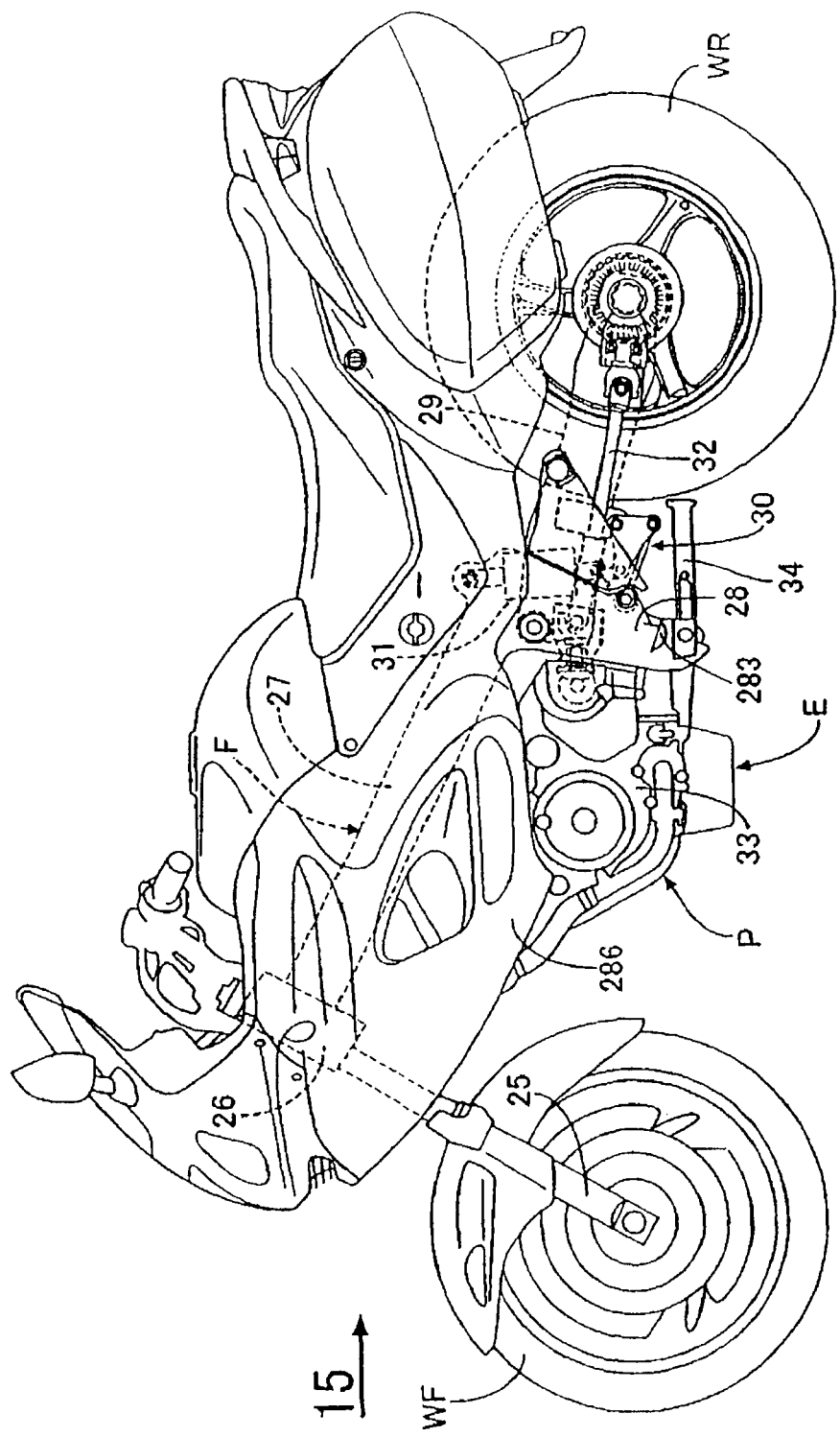
FIG. 1 is a left side view of a motorcycle.

DETAILED DESCRIPTION OF THE INVENTION in FIG. 1, a vehicle body frame F of a motorcycle, which is a saddle-riding type small vehicle, includes a head pipe 26 that is used to steer a front fork 25 pivotally supporting a front wheel WF, a pair of left and right main frames 27 that extend downward from the head pipe 26, and a pair of left and right pivot plates 28 that are connected to the rear portions of both main frames 27 to extend downward. A rear wheel WR is pivotally supported by the rear portions of swing arms 29, of which front ends are swingably supported by the pivot plates 28. In addition, links 30 are provided between the front portions of the swing arms 29 below the pivot plates 28, and a cushion unit 31 is provided between the links 30, above the pivot plates 28.

A power unit P is suspended from and mounted on the main frames 27 and the pivot plates 28, and rotative power output from the power unit P is transmitted to the rear wheel WR through, for example, a drive shaft 32 extending in a forward and backward direction.

The power unit P includes an engine E, and a side stand 34 is mounted to an engine body 33 of the engine E or the vehicle body frame F. In this embodiment, the side stand 34 is mounted below the left pivot plate 28 of the vehicle body frame F. Accordingly, when being parked while the side stand 34 stands, the motorcycle is inclined to the left side.

Figure 2:
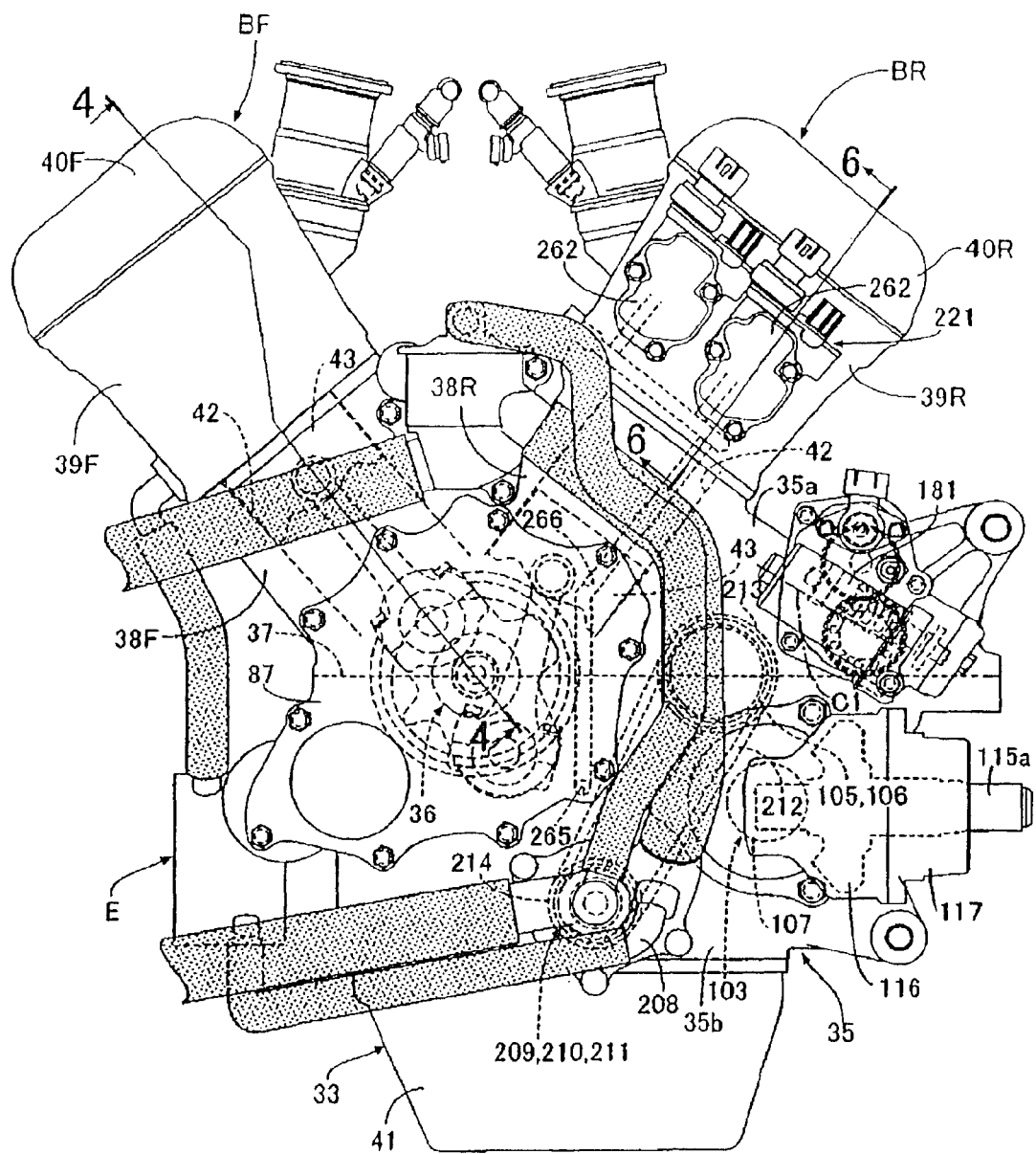
FIG. 2 is a left side view of a power unit.
Figure 3:
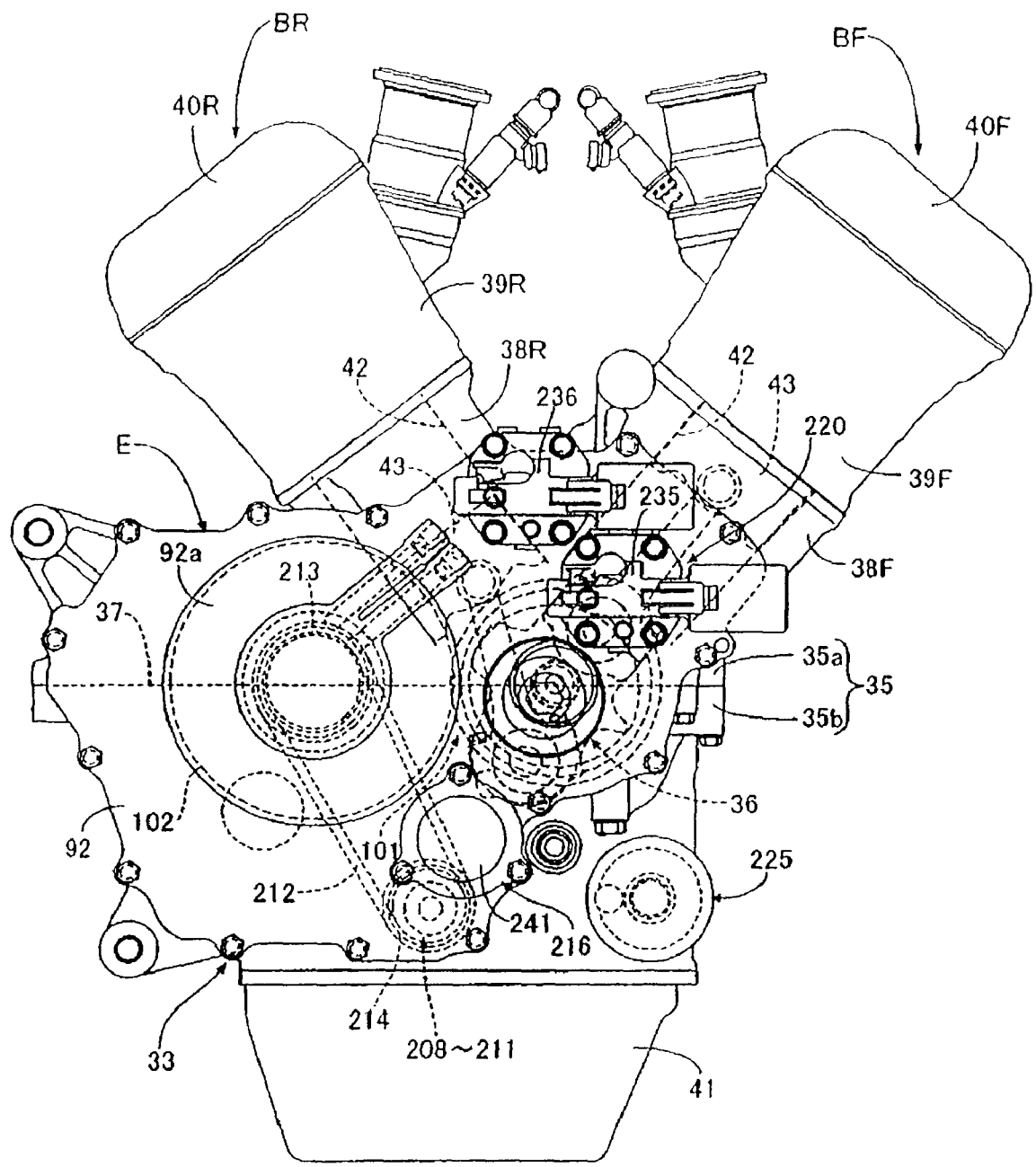
FIG. 3 is a right side view of the power unit

In FIGS. 2 and 3, the engine body 33 of the engine E includes a front bank BF that is positioned forward while being mounted on the motorcycle, and a rear bank BR that is positioned at the rear of the front bank BF. The engine body has a V-shaped water-cooled type structure. A crankshaft 36 is rotatably supported by a crankcase 35 common to both banks BF and BR along the left and right direction of the motorcycle.

A crankcase 35 includes an upper half case 35a and a lower half case 35b that are mounted on each other, front and rear cylinder blocks 38F and 38R integrally formed with the upper half case 35a so as to form a V shape, and an axis of the crankshaft 36 disposed on a coupling surface 37 between the upper and lower half cases 35a and 35b.

The front bank BF includes a front cylinder block 38F that integrally extends from the upper half case 35a of the crankcase 35, a front cylinder head 39F mounted on the front cylinder block 38F, and a front head cover 40F mounted on the front cylinder head 39F. The rear bank BR includes a rear cylinder block 38R that integrally extends from the upper half case 35a of the crankcase 35, a rear cylinder head 39R mounted on the rear cylinder block 38R, and a rear head cover 40R mounted on the rear cylinder head 39R. An oil pan 41 is mounted on the lower portion of the crankcase 35.

Two cylinder bores 42 disposed side by side in the axial direction of the crankshaft 36 are formed in the front cylinder block 38F. The front cylinder block 38F is mounted on the crankcase 35 so that the axes of the cylinder bores 42 are inclined upward toward the front side while being suspended from the vehicle body frame F of the engine body 33. Further, two cylinder bores 42 disposed side by side in the axial direction of the crankshaft 36 are formed in the rear cylinder block 38R. The rear cylinder block 38R is mounted on the crankcase 35 so that the axis of each of the cylinder bores 42 is inclined upward toward the rear side while being suspended from the vehicle body frame F of the engine body 33. Pistons 43, which are slidably fitted into both cylinder bores 42 of the front bank BF, respectively, and pistons 43, which are slidably fitted into both cylinder bores 42 of the rear bank BR, respectively, are commonly connected to the crankshaft 36.

Figure 4:
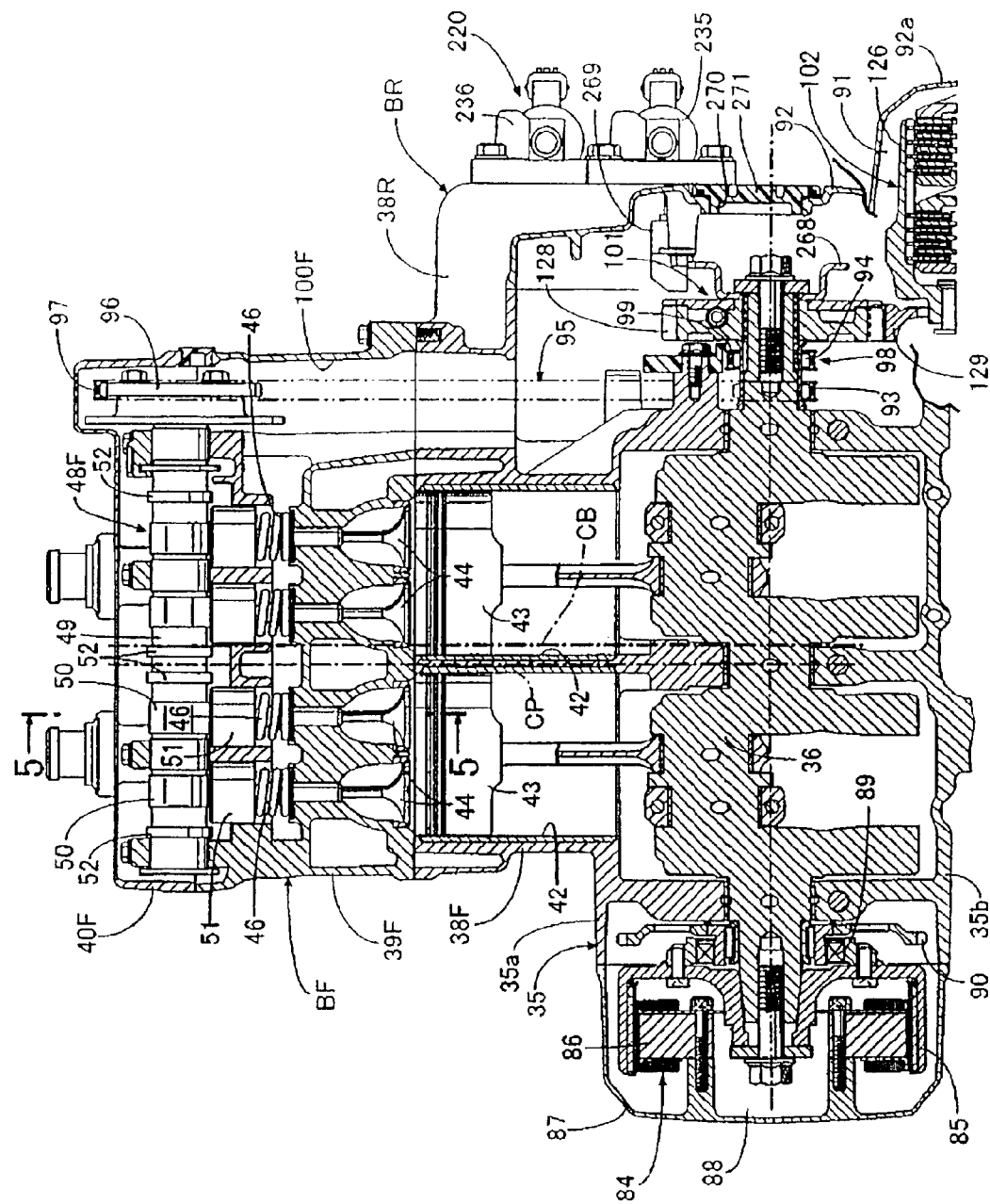
FIG. 4 is a cross-sectional view taken along a line 4-4 of FIG. 2.
Figure 5:
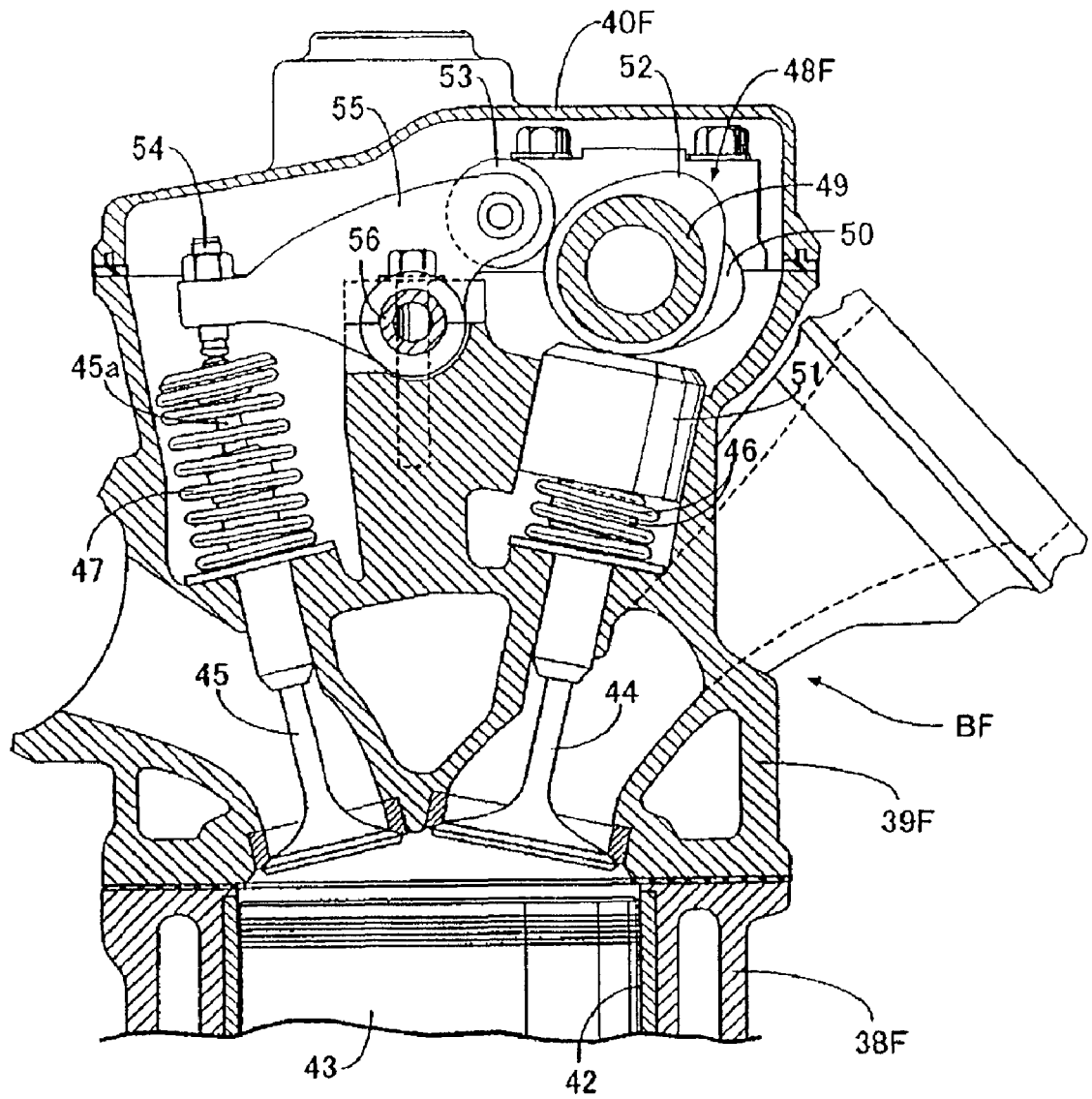
FIG. 5 is a cross-sectional view taken along a line 5-5 of FIG. 4.

In FIGS. 4 and 5, in each of the cylinder bores 42 of the front cylinder head 39F, a pair of intake valves 44 is disposed and pushed in a valve closing direction by valve springs 46 so as to be opened and closed, and a pair of exhaust valves 45 is pushed in the valve closing direction by valve springs 47 so as to be opened and closed. The intake valves 44 and the exhaust valves 45 are driven by a front-bank valve system 48F so as to be opened and closed.

The front-bank valve system 48F includes a camshaft 49, intake valve lifters 51, and rocker arms 55. The camshaft has an axis parallel to the crankshaft 36, is rotatably supported by the front cylinder head 39F, and is disposed above the intake valves 44. The intake valve lifters 51 are provided between a plurality of (in this embodiment, four) intake cams 50 provided on the camshaft 49 and the intake valves 44, and are slidably fitted to the front cylinder head 39F. Rollers 53, which come into rolling contact with a plurality of (in this embodiment, four) exhaust cams 52 provided on the camshaft 49, are provided at one end of each of the rocker arms. Tappet screws 54, which come in contact with upper ends of stems 45a of the exhaust valves 45, are threadedly engaged with the other end of each of the rocker arms, so that the advance-retreat positions of the tappet screws can be adjusted. The rocker arms 55 have axes parallel to the camshaft 49, and are swingably supported by a rocker shaft 56 fixed to the front cylinder head 39F.

Figure 6:
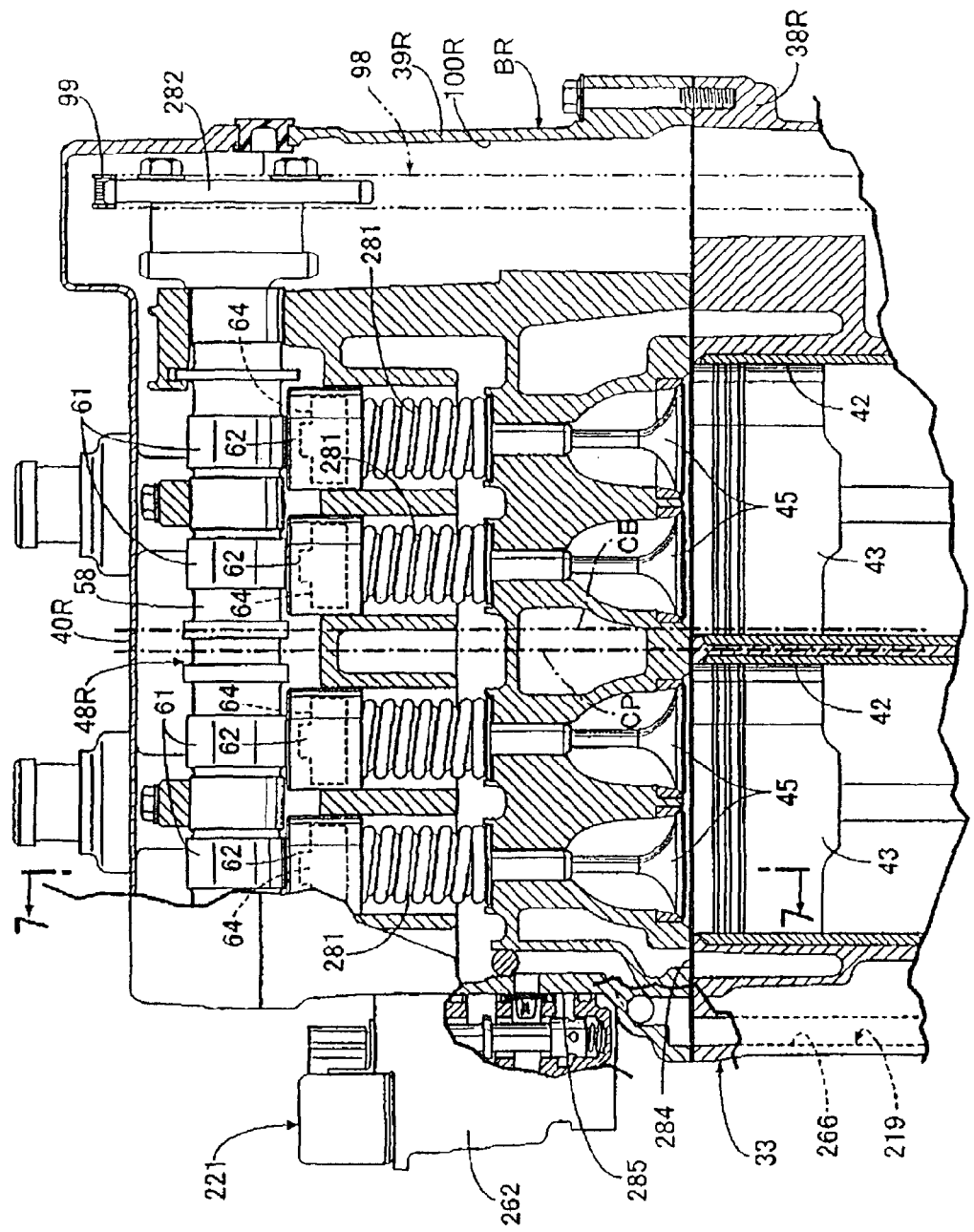
FIG. 6 is a cross-sectional view taken along a line 6-6 of FIG. 2.
Figure 7:
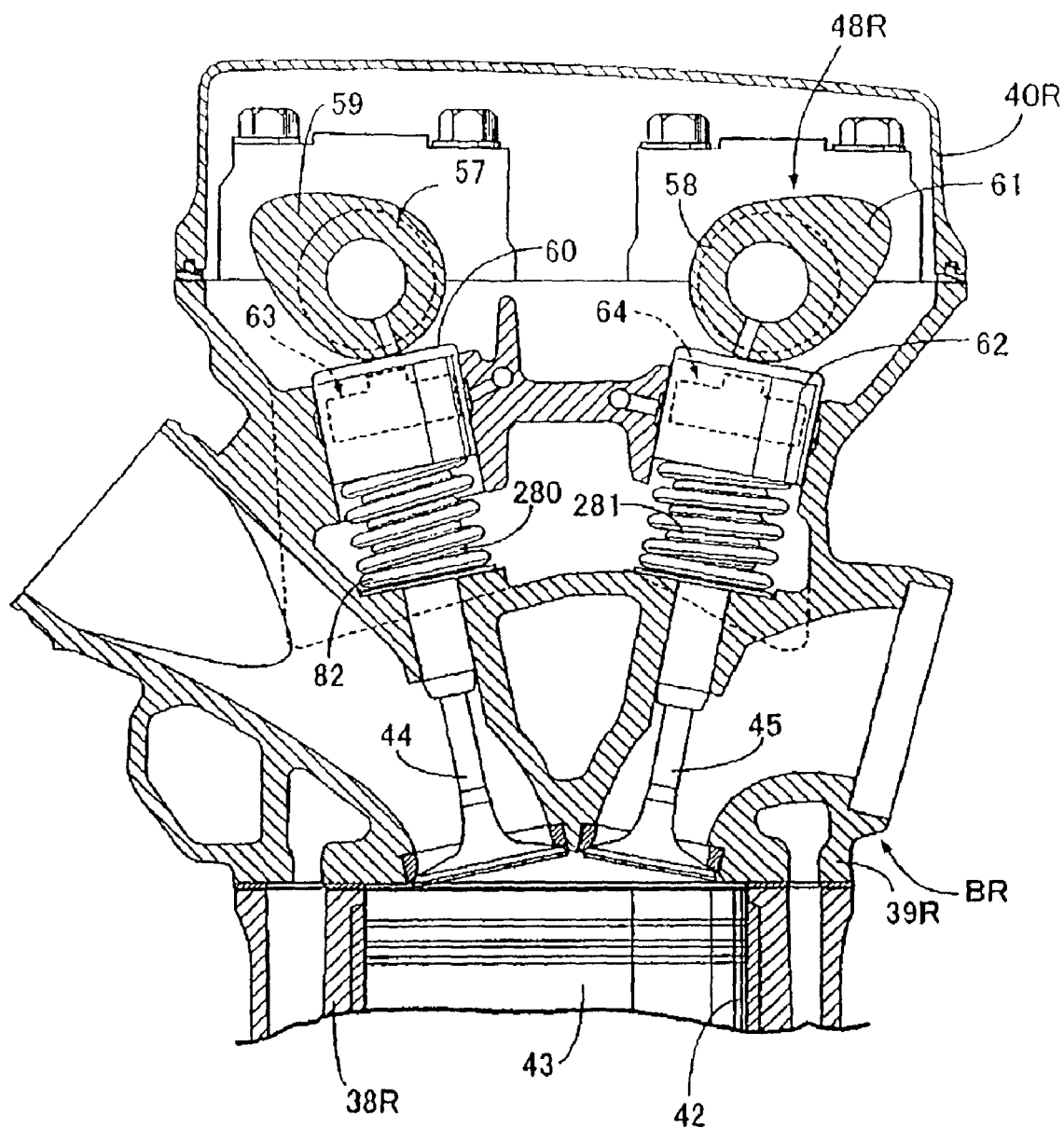
FIG. 7 is a cross-sectional view taken along a line 7-7 of FIG. 6.

In FIGS. 6 and 7, in each of the cylinder bores 42 of the rear cylinder head 39R, a pair of intake valves 44 and a pair of exhaust valves 45 are disposed and pushed in a valve closing direction by valve springs 280 and 281 so as to be opened and closed. The intake valves 44 and the exhaust valves 45 are driven by a rear-bank valve system 48R so as to be opened and closed. The rear-bank valve system 48R includes an intake camshaft 57, an exhaust camshaft 58, intake valve lifters 60, and exhaust valve lifters 62. The intake camshaft has an axis parallel to the crankshaft 36, is rotatably supported by the rear cylinder head 39R, and is disposed above the intake valves 44. The exhaust camshaft has an axis parallel to the crankshaft 36, is rotatably supported by the rear cylinder head 39R, and is disposed above the exhaust valves 45. The intake valve lifters are provided between a plurality of (in this embodiment, four) intake cams 59 provided on the intake camshaft 57 and the intake valves 44, and are slidably fitted to the rear cylinder head 39R. The exhaust valve lifters are provided between a plurality of (in this embodiment, four) exhaust cams 61 provided on the exhaust camshaft 58 and the exhaust valves 45, and are slidably fitted to the rear cylinder head 39R.

In addition, the rear-bank valve system 48R is provided with an intake valve-operation mode changing mechanism 63 and an exhaust valve-operation mode changing mechanism 64. The intake valve-operation mode changing mechanism 63 can shift the operation mode of the intake valves 44 of the two cylinders of the rear bank BR between a state where the intake valve is opened and closed and a state where the intake valve is closed and pauses. The exhaust valve-operation mode changing mechanism can shift the operation mode of the exhaust valves 45 of the two cylinders between the state where the exhaust valve is opened and closed and the state where the exhaust valve is closed and pauses.

Figure 8:
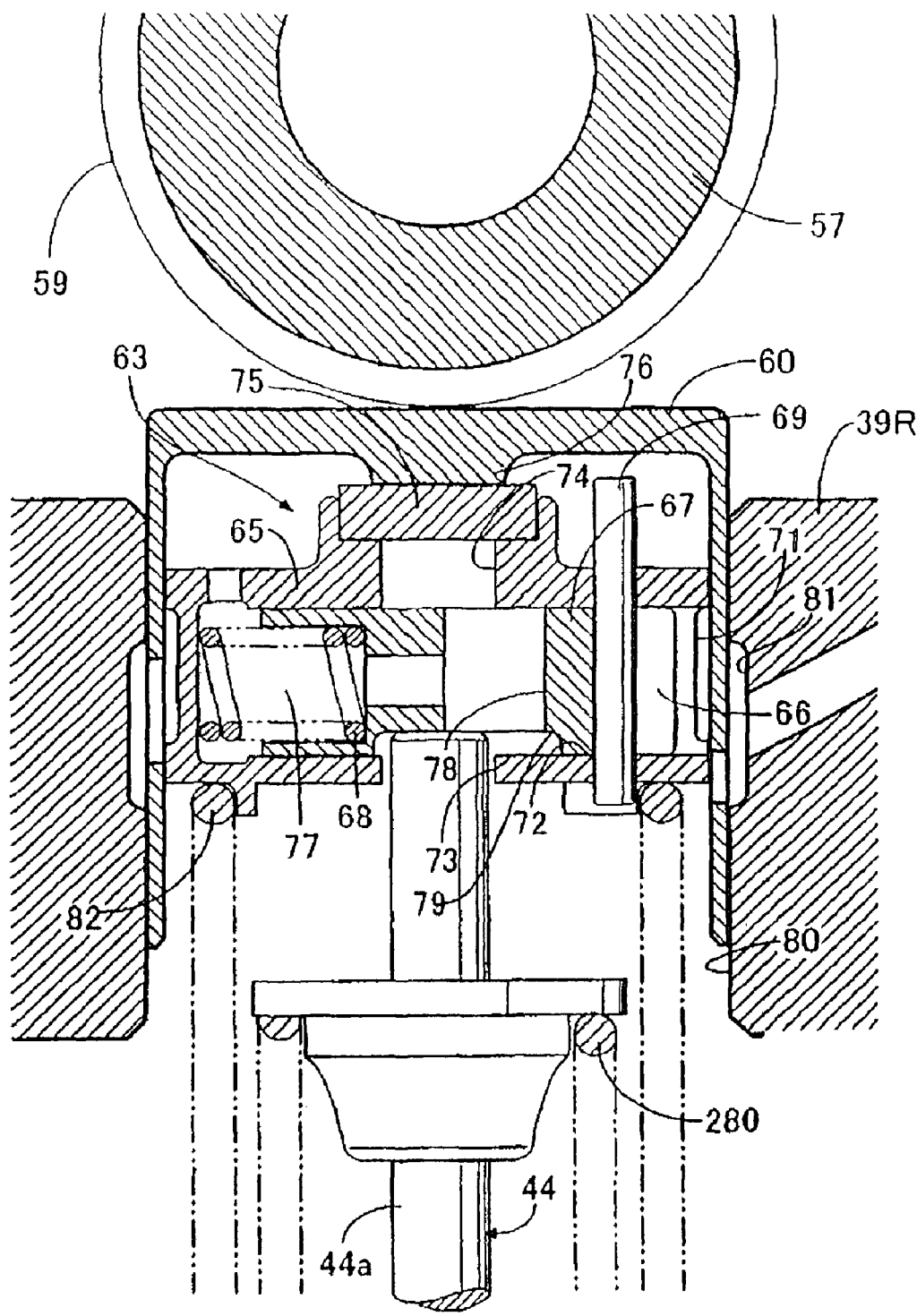
FIG. 8 is an enlarged cross-sectional view of main parts of FIG. 7.

In FIG. 8, the intake valve-operation mode changing mechanism 63 is provided to be associated with the intake valve lifters 60. The intake valve-operation mode changing mechanism includes a pin holder 65 that is slidably fitted to the intake valve lifter 60, a slide pin 67 that forms a hydraulic chamber 66 between the inner surfaces of the intake valve lifters 60 and is slidably fitted to the pin holder 65, a return spring 68 that is provided between the slide pin 67 and the pin holder 65 and applies a spring force for pushing the slide pin 67 in a direction where the volume of the hydraulic chamber 66 is decreased, and a stopper pin 69 that prevents the slide pin 67 from being rotated around an axis and is provided between the pin holder 65 and the slide pin 67.

An annular groove 71 is formed on the outer periphery of the pin holder 65. A slide hole 72 has an axis orthogonal to an axis of the intake valve lifter 60. The slide hole 72 having a bottom, of which one end is opened to the annular groove 71 and the other end thereof is closed, is formed in the pin holder 65. Further, an insertion hole 73 into which the tip of a stem 44a of the intake valve 44 pushed in the valve closing direction by the valve spring 280 is inserted, and an extension hole 74 are coaxially formed in the pin holder 65 so as to receive the tip of the stem 44a of the intake valve 44, with a slide hole 72 being formed between the insertion hole 73 and the extension hole 74. A disk-shaped shim 75, which closes the end of the extension hole 74 at the closed end of the intake valve lifter 60, is fitted to the pin holder 65, and a protrusion 76 coming in contact with the shim 75 is integrally formed with the central portion of the inner surface of the closed end of the intake valve lifter 60.

The slide pin 67 is slidably fitted into the slide hole 72 of the pin holder 65. A hydraulic chamber 66, which communicates with the annular groove 71, is formed between one end of the slide pin 67 and the inner surface of the intake valve lifter 60. The return spring 68 is received in a spring chamber 77, which is formed between the other end of the slide pin 67 and the closed end of the slide hole 72.

A receiving hole 78, which is coaxially connected to the insertion hole 73 and the extension hole 74, is formed at the middle portion of the slide pin 67 in an axial direction so as to receive the tip of the stem 44a. An end of the receiving hole 78 close to the insertion hole 73 is opened to a flat contact surface 79 that is formed on the outer surface of the lower portion of the slide pin 67 so as to face the insertion hole 73. The contact surface 79 is formed to be relatively long in an axial direction of the slide pin 67, and the receiving hole 78 is opened to a portion of the contact surface 79 close to the hydraulic chamber 66.

The slide pin 67 slides in the axial direction so that a hydraulic force applied to one end of the slide pin 67 due to the hydraulic pressure of the hydraulic chamber 66 balances a spring force applied to the other end of the slide pin 67 due to the return spring 68. When the hydraulic pressure of the hydraulic chamber 66 is low, that is, when the slide pin is not operated, the slide pin moves to the right side in FIG. 8 so that the receiving hole 78 deviates from the axes of the insertion hole 73 and the extension hole 74 and the tip of the stem 44a comes in contact with the contact surface 79. When the hydraulic pressure of the hydraulic chamber 66 is high, that is, when the slide pin is operated, the slide pin moves to the left side in FIG. 8 so that the tip of the stem 44a inserted into the insertion hole 73 is received in the receiving hole 78 and the extension hole 74.

When the slide pin 67 moves to a position where the receiving hole 78 is coaxially connected to the insertion hole 73 and the extension hole 74, the pin holder 65 and the slide pin 67 also move toward the intake valve 44 together with the intake valve lifter 60 as the intake valve lifter 60 slides due to a pressing force applied from the intake cam 59. However, if the tip of the stem 44a is received in the receiving hole 78 and the extension hole 74, a pressing force in the valve opening direction is not applied from the intake valve lifter 60 and the pin holder 65 to the intake valve 44 and the intake valve 44 pauses. Further, when the slide pin 67 moves to a position where the tip of the stem 44a comes in contact with the contact surface 79, a pressing force in the valve opening direction is applied to the intake valve 44 with the movement of the pin holder 65 and the slide pin 67 to the intake valve 44 as the intake valve lifter 60 slides due to the pressing force applied from the intake cam 59. Therefore, as the intake cam 59 is rotated, the intake valve 44 is opened and closed.

Support holes 80 into which the intake valve lifters 60 are fitted are formed in the rear cylinder head 39R, so as to slidably support the intake valve lifters 60. Annular recesses 81 communicating with the annular groove 71 of the pin holder 65 are formed on the inner surfaces of the support holes 80 so as to surround the intake valve lifters 60 regardless of the slide of the intake valve lifters 60 in the support holes 80. Further, springs 82, which push the intake valve lifters 60 so that the intake valve lifters come in contact with the intake cams 59, are provided between the intake valve lifters 60 and the rear cylinder head 39R.

The exhaust valve-operation mode changing mechanism 64 has the same structure as the intake valve-operation mode changing mechanism 63, and is provided to be associated with the exhaust valve lifters 62. The exhaust valve-operation mode changing mechanism can shift the operation mode of the exhaust valve 45 into the state where the exhaust valve 45 is closed and pauses when high hydraulic pressure is applied, and can shift the operation mode of the exhaust valve 45 into the state where the exhaust valve 45 is opened and closed when the hydraulic pressure is decreased.

That is, the rear-bank valve system 48R can shift the operation mode of the intake and exhaust valves 44 and 45 of two cylinders of the rear bank BR into the state where the valves are opened and closed, and can shift the operation mode of the intake and exhaust valves 44 and 45 of two cylinders of the rear bank BR into the state where the valves are closed and pause, by the control of the operation of the intake and exhaust valve-operation mode changing mechanisms 63 and 64.

Returning to FIG. 4, an electric generator 84 is connected to the left end of the crankshaft 36 when the engine body 33 is mounted on the vehicle body frame F. The electric generator 84 includes a rotor 85 that is fixed to the crankshaft 36 and a stator 86 that is fixedly disposed in the rotor 85. The electric generator is received in an electric generator receiving chamber 88 that is composed of the crankcase 35 and an electric generator cover 87 mounted on the left side surface of the crankcase 35. The stator 86 is fixed to the electric generator cover 87.

In addition, a gear 90 is connected to the rotor 86 by a one-way clutch 89 that can transmits power to the rotor 86, and power is transmitted from a starter motor (not shown) to the gear 90.

Meanwhile, a clutch cover 92, which forms a clutch chamber 91 between the crankcase 35 and itself, is mounted on the right side surface of the crankcase 35 when the engine body 33 is mounted on the vehicle body frame F. In the clutch chamber 91, driving sprockets 93 and 94 are fixed to the crankshaft 36. One driving sprocket 93 forms a part of a front-bank timing transmission mechanism 95 that transmits rotative power of the crankshaft 36 to the camshaft 49 of the front-bank valve system 48F at a speed reduction ratio of 1/2. The front-bank timing transmission mechanism 95 is formed by winding an endless cam chain 97 around the driving sprocket 93 and a driven sprocket 96 provided at one end (the right end when the power unit P is mounted on the vehicle body frame F) of the camshaft 49.

Referring to FIG. 6, the other driving sprocket 94 forms a part of a rear-bank timing transmission mechanism 98, which transmits rotative power of the crankshaft 36 to the intake and exhaust camshafts 57 and 58 of the rear-bank valve system 48R at a speed reduction ratio of 1/2. The rear-bank timing transmission mechanism 98 is formed by winding an endless cam chain 99 around the driving sprocket 94 and driven sprockets 282 provided at one end (the right ends when the power unit P is mounted on the vehicle body frame F) of each of the intake and exhaust camshafts 57 and 58.

A cam chain chamber 100F in which the cam chain 97 moves is formed in the front cylinder block 38F and front cylinder head 39F, and a cam chain chamber 100R in which the earn chain 99 moves is formed in the rear cylinder block 38R and the rear cylinder head 39R.

Figure 9:
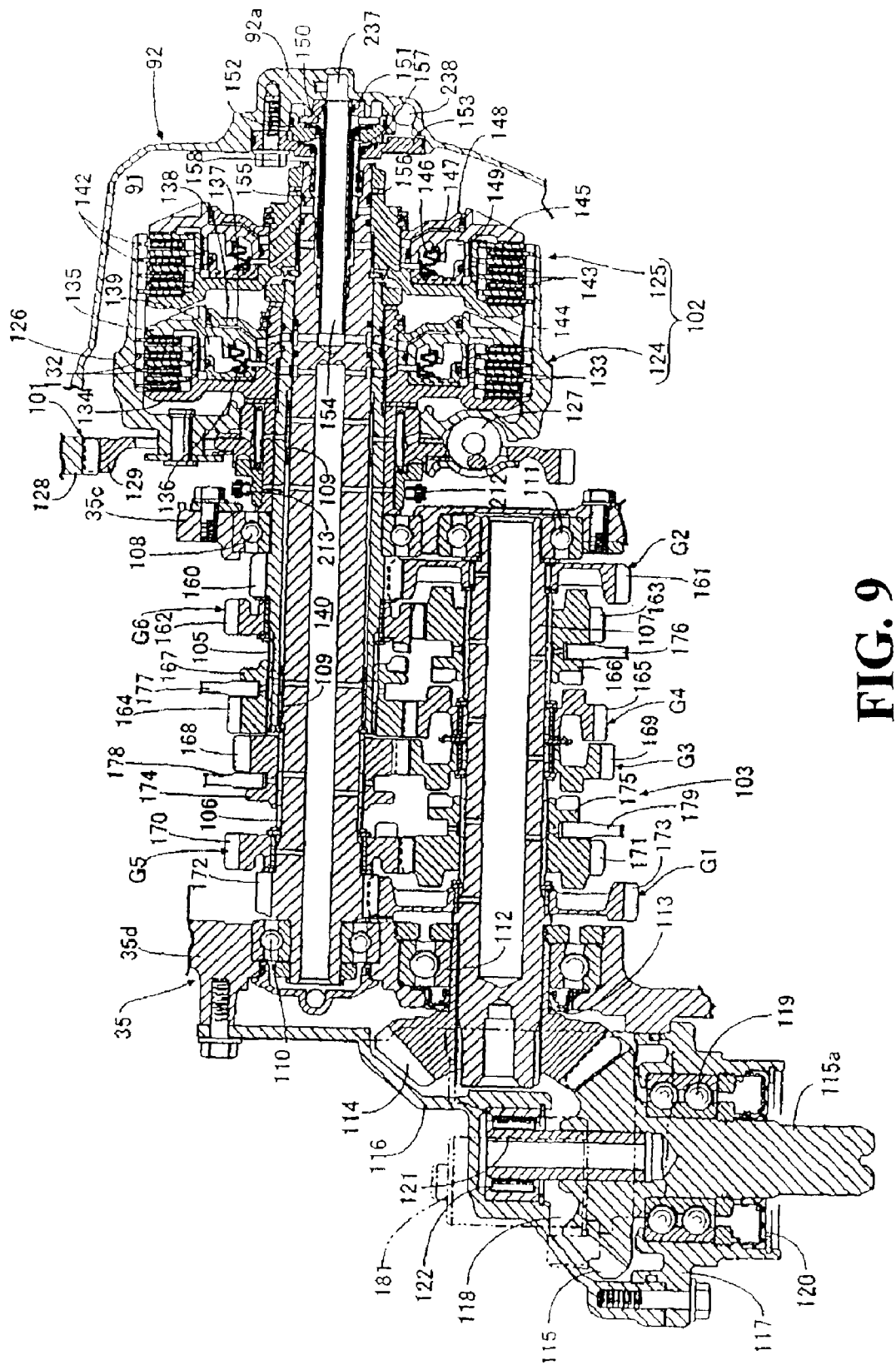
FIG. 9 is a longitudinal cross-sectional view of a gear shift mechanism and a clutch unit.

Referring to FIG. 9, a power transmission path between the crankshaft 36 and the rear wheel WR is sequentially provided with a primary speed reduction device 101, a clutch unit 102, a gear shift mechanism 103, and a drive shaft 32, from the crankshaft 36. The primary speed reduction device 101 and the clutch unit 102 are received in the clutch chamber 91, and the gear shift mechanism 103 is received in the crankcase 35.

The gear shift mechanism 103 includes selectively establishable gear trains having a plurality of shift stages, for example, first to sixth speed gear trains G1, G2, G3, G4, G5, and G6, and is received in the crankcase 35. The second, fourth, and sixth speed gear trains G2, G4, and G6 are provided between a first main shaft 105 and a countershaft 107. The first, third, and fifth speed gear trains G1, G3, and G5 are provided between a second main shaft 106 that coaxially passes through the first main shaft 105 and is relatively rotated, and the countershaft 107.

The crankcase 35 includes a pair of side walls 35c and 35d that face each other with a gap therebetween in the axial direction of the crankshaft 36. The middle portion of the first main shaft 105, which has an axis parallel to the crankshaft 36 and is formed in a cylindrical shape, rotatably passes through the side wall 35c. A ball bearing 108 is provided between the side wall 35c and the first main shaft 105. Further, the second main shaft 106, which has an axis parallel to the crankshaft 36, relatively rotatably passes through the first main shaft 105 while having a constant position relative to the first main shaft 105 in the axial direction. A plurality of needle bearings 109 are provided between the first main shaft 105 and the second main shaft 106. Furthermore, the other end of the second main shaft 106 is rotatably supported by a ball bearing 110 on the side wall 35d of the crankcase 35.

One end of the countershaft 107, which has an axis parallel to the crankshaft 36, is rotatably supported by a ball bearing 111 on the side wall 35c. The other end of countershaft 107 rotatably passes through the side wall 35d while a ball bearing 112 and an annular seal member 113 are provided between the side wail 35d and the other end of countershaft. A driving bevel gear 114 is fixed to an end of the countershaft 107 that protrudes from the side wall 35d. A driven bevel gear 115, which has a rotation axis extending in the forward and backward direction of the motorcycle, is engaged with the driving bevel gear 114.

Meanwhile, the driving bevel gear 114 and the driven bevel gear 115 are engaged with each other in a gear chamber 118. The gear chamber 118 is formed by a first gear cover 116 that covers a part of the side wall 35d of the crankcase 35 and is detachably mounted on the side wall 35d, a second gear cover 117 that is detachably mounted on the first gear cover 116, and the side wall 35d. A shaft 115a, which is coaxially provided with the driven bevel gear 115, rotatably passes through the second gear cover 117. A ball bearing 119 and an annular seal member 120, which is positioned outside the ball bearing 119, are provided between the shaft 115a and the second gear cover 117. Further, one end of a support shaft 121 is fitted to the driven bevel gear 115, and the other end of the support shaft 121 is rotatably supported by a roller bearing 122 on the first gear cover 116. The shaft 115a is connected to the drive shaft 32.

Figure 10:
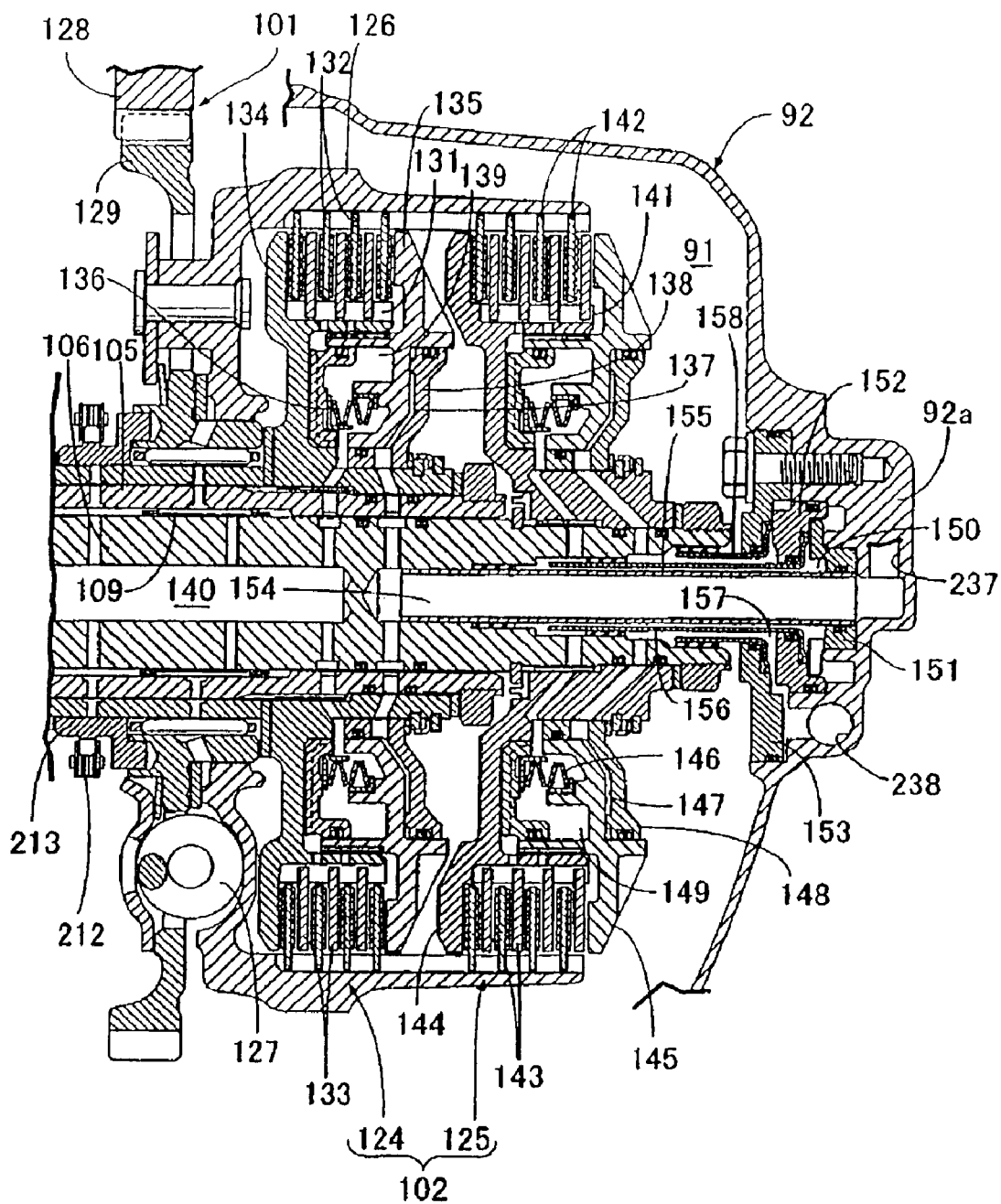
FIG. 10 is an enlarged view of main parts of FIG. 9.

Referring to FIG. 10, the clutch unit 102 has a twin type structure that includes first and second clutches 124 and 125 provided between the gear shift mechanism 103 and the crankshaft 36. The first clutch 124 is provided between the crankshaft 36 and one end of the first main shaft 105, and the second clutch 125 is provided between the crankshaft 36 and one end of the second main shaft 106. Power from the crankshaft 36 is input to a clutch outer 126, which is common to the first and second clutches 124 and 125, through the primary speed reduction device 101 and a damper spring 127.

The primary speed reduction device 101 includes a driving gear 128 that is provided on the crankshaft 36 on the outside of the driving sprocket 94, and a driven gear 129 that is relatively rotatably supported by the first main shaft 105 and is engaged with the driving gear 128. The driven gear 129 is connected to the clutch outer 126 with the damper spring 127 interposed therebetween.

As shown in FIG. 4, a pulsar 268 is mounted to the end of the crankshaft 36 that is positioned on the outside of the primary speed reduction device 101. A rotation speed detector 269, which detects the rotation speed of the crankshaft 36 by detecting the pulsar 268, is mounted on the inner surface of the clutch cover 92.

Further, an inspection hole 270, which is used to inspect the pulsar 268, is formed in the clutch cover 92. However, in order to reduce the diameter of the inspection hole as much as possible, the inspection hole 270 is provided on the clutch cover 92 so as to be eccentric from the axis of the crankshaft 36. The inspection hole 270 is closed by a detachable lid member 271.

The first clutch 124 includes the clutch outer 126, a first clutch inner 131, a plurality of first friction plates 132, a plurality of second friction plates 133, a first shock plate 134, a first piston 135, and a first spring 136. The first clutch inner is coaxially surrounded by the clutch outer 126, and is coupled with the first main shaft 105 not to be relatively rotated. The first friction plates are engaged with the clutch outer 126 not to be relatively rotated. The second friction plates are engaged with the first clutch inner 131 not to be relatively rotated, and are disposed alternately with the first friction plates 132. The first shock plate is provided in the first clutch inner 131 so as to face the first and second friction plates 132 and 133 that are disposed to overlap each other. The first and second friction plates 132 and 133 are interposed between the first shock plate 134 and the first piston 135. The first spring pushes the first piston 135.

An end wall member 138, which forms a first hydraulic chamber 137 facing the back surface of the first piston 135 between the first piston 135 and itself, is fixedly disposed in the first clutch inner 131. As the hydraulic pressure of the first hydraulic chamber 137 is increased, the first piston 135 is operated to press the first and second friction plates 132 and 133 between the first shock plate 134 and itself. Accordingly, the first clutch 124 and the clutch outer 126 are in the state where power transmitted from the crankshaft 36 is transmitted to the first main shaft 105. Further, a canceller chamber 139 facing the front surface of the first piston 135 is formed between the first clutch inner 131 and the first piston 135, and the first spring 136 is received in the canceller chamber 139 so as to apply a spring force in a direction where the volume of the first hydraulic chamber 137 is decreased.

In addition, the canceller chamber 139 communicates with a first oil passage 140 coaxially provided in the second main shaft 106, which is used to supply oil to each lubricating part of the gear shift mechanism 103 and a gap between the first and second main shafts 105 and 106. Accordingly, even though a centrifugal force caused by rotation is applied to oil of the first hydraulic chamber 137 under reduced pressure and a force pressing the first piston 135 is thus generated, it is possible to prevent the first piston 135 from undesirably moving in a direction where the first and second friction plates 132 and 133 are interposed between the first shock plate 134 and the first piston 135 because a centrifugal force is applied likewise to the oil of the canceller chamber 139.

The second clutch 125 is disposed side by side with the first clutch 124 in the axial direction of the second main shaft 106 so that the first clutch 124 is interposed between the primary speed reduction device 101 and the second clutch. The second clutch includes the clutch outer 126, a second clutch inner 141, a plurality of third friction plates 142, a plurality of fourth friction plates 143, a second shock plate 144, a second piston 145, and a second spring 146. The second clutch inner 141 is coaxially surrounded by the clutch outer 126, and is coupled with the second main shaft 106 not to be relatively rotated. The third friction plates 142 are engaged with the clutch outer 126 not to be relatively rotated. The fourth friction plates 143 are engaged with the second clutch inner 141 not to be relatively rotated, and are disposed alternately with the third friction plates 142. The second shock plate 144 is provided in the second clutch inner 141 so as to face the third and fourth friction plates 142 and 143 that are disposed to overlap each other. The third and fourth friction plates 142 and 143 are interposed between the second shock plate 144 and the second piston 145. The second spring 146 pushes the second piston 145.

An end wall member 148, which forms a second hydraulic chamber 147 facing the back surface of the second piston 145 between the second piston 145 and itself, is fixedly disposed in the second clutch inner 141. As the hydraulic pressure of the second hydraulic chamber 147 is increased, the second piston 145 is operated to press the third and fourth friction plates 142 and 143 between the second shock plate 144 and itself. Accordingly, the second clutch 125 and the clutch outer 126 are in the state where power transmitted from the crankshaft 36 is transmitted to the second main shaft 106. Further, a canceller chamber 149 facing the front surface of the second piston 145 is formed between the second clutch inner 141 and the second piston 145, and the second spring 146 is received in the canceller chamber 149 so as to apply a spring force in a direction where the volume of the second hydraulic chamber 147 is decreased.

In addition, the canceller chamber 149 communicates with a second oil passage 150 to be described below. Accordingly, even though a centrifugal force caused by rotation is applied to oil of the second hydraulic chamber 147 under reduced pressure and a force pressing the second piston 145 is thus generated, it is possible to prevent the second piston 145 from undesirably moving in a direction where the third and fourth friction plates 142 and 143 are interposed between the second shock plate 144 and the second piston 144 because a centrifugal force is applied likewise to the oil of the canceller chamber 149.

First, second, and third partition members 151, 152, and 153 are mounted on the inner surface of a clutch cover 92, which covers the first and second clutches 124 and 125 from the right side forward in a traveling direction of the motorcycle. A first cylindrical member 155, which forms a first oil passage 154 communicating with the first hydraulic chamber 137 of the first clutch 124, is provided between the second main shaft 106 and the first partition member 151. A second cylindrical member 156 is provided between the second main shaft 106 and the second partition member 152. The second cylindrical member 156 forms an annular second oil passage 150, which communicates with the canceller chamber 149 of the second clutch 125, between the first cylindrical member 155 and itself, and coaxially surrounds the first cylindrical member 155. A third cylindrical member 158 is provided between the second main shaft 106 and the third partition member 153. The third cylindrical member forms an annular second oil passage 157, which communicates with the second hydraulic chamber 147, between the second cylindrical member 156 and itself, and coaxially surrounds the second cylindrical member 156.

Returning to FIG. 9, the fourth speed gear train G4, the sixth speed gear train G6, and the second speed gear train G2 are sequentially provided side by side from the side opposite to the clutch unit 102 between the first main shaft 105 and the countershaft 107 of the gear shift mechanism 103. The second speed gear train G2 includes a second speed driving gear 160 that is integrally formed with the first main shaft 105, and a second speed driven gear 161 that is relatively rotatably supported by the countershaft 107 and engaged with the second speed driving gear 160. The sixth speed gear train G6 includes a sixth speed driving gear 162 that is relatively rotatably supported by the first main shaft 105, and a sixth speed driven gear 163 that is supported by the countershaft 107 to move in the axial direction and not to be relatively rotated and engaged with the sixth speed driving gear 162. The fourth speed gear train G4 includes a fourth speed driving gear 164 that is supported by the first main shaft 105 to move in the axial direction and not to be relatively rotated, and a fourth speed driven gear 165 that is relatively rotatably supported by the countershaft 107 and engaged with the fourth speed driving gear 164.

A first shifter 166 is supported by the countershaft 107 between the second and fourth speed driven gears 161 and 165 to move in the axial direction and not to be relatively rotated. The state of the first shifter 166 can be shifted into a state where the first shifter 166 is engaged with the second speed driven gear 161, a state where the first shifter 166 is engaged with the fourth speed driven gear 165, and a state where the first shifter 166 is not engaged with any one of the second and fourth speed driven gears 161 and 165. A sixth speed driven gear 163 is integrally provided on the first shifter 166. Further, the fourth speed driving gear 164 is integrally provided on a second shifter 167 that is supported by the first main shaft 105 to move in the axial direction and not to be relatively rotated. The second shifter 167 can be shifted to be engaged with and disengaged from the sixth speed driving gear 162.

When the second shifter 167 is not engaged with the sixth speed driving gear 162, the second speed gear train G2 is established by engaging the first shifter 166 with the second speed driven gear 161. When the second shifter 167 is not engaged with the sixth speed driving gear 162, the fourth speed gear train G4 is established by engaging the first shifter 166 with the fourth speed driven gear 165. When the first shifter 166 is in a neutral state, the sixth speed gear train G6 is established by engaging the second shifter 167 with the sixth speed driving gear 162.

The first speed gear train G1, the fifth speed gear train G5, and the third speed gear train G3 are sequentially provided side by side from the side opposite to the clutch unit 102 between the portion of the second main shaft 106, which protrudes from the other end of the first main shaft 105, and the countershaft 107. The third speed gear train G3 includes a third speed driving gear 168 that is supported by the second main shaft 106 to move in the axial direction and not to be relatively rotated, and a third speed driven gear 169 that is relatively rotatably supported by the countershaft 107 and engaged with the third speed driving gear 168. The fifth speed gear train G5 includes a fifth speed driving gear 170 that is relatively rotatably supported by the second main shaft 106, and a fifth speed driven gear 171 that is supported by the countershaft 107 to move in the axial direction and not to be relatively rotated and is engaged with the fifth speed driving gear 170. The first speed gear train G1 includes a first speed driving gear 172 that is integrally provided on the second main shaft 106, and a first speed driven gear 173 that is relatively rotatably supported by the countershaft 107 and engaged with the first speed driving gear 172.

The third speed driving gear 168 is integrally provided on a third shifter 174 that is supported by the second main shaft 106 to move in the axial direction and not to be relatively rotated. The third shifter 174 can be shifted to be engaged with and disengaged from the fifth speed driving gear 170. A fourth shifter 175 is supported by the countershaft 107 between the third and first speed driven gears 169 and 173 to move in the axial direction and not to be relatively rotated. The state of the fourth shifter 175 can be shifted into a state where the fourth shifter 175 is engaged with the third speed driven gear 169, a state where the fourth shifter 175 is engaged with the first speed driven gear 173, and a state where the fourth shifter 175 is not engaged with any one of the third speed driven gear 169 and the first speed driven gear 173. A fifth speed driven gear 171 is integrally provided on the fourth shifter 175.

When the third shifter 174 is not engaged with the fifth speed driving gear 170, the first speed gear G1 is established by engaging the fourth shifter 175 with the first speed driven gear 173. When the third shifter 174 is not engaged with the fifth speed driving gear 170, the third speed gear train G3 is established by engaging the fourth shifter 175 with the third speed driven gear 169. When the fourth shifter 175 is in a neutral state, the fifth speed gear train G5 is established by engaging the third shifter 174 with the fifth speed driving gear 170. The first to fourth shifters 166, 167, 174, and 175 are rotatably supported by first to fourth shift forks 176, 177, 178, and 179. The shift forks 176 to 179 are driven in the axial directions of the main shafts 105 and 106 and the countershaft 107, so that the first to fourth shifters 166, 167, 174, and 175 are operated in the axial directions.

Each of the first to fourth shift forks 176 to 179 has an axis parallel to the crankshaft 36, and is engaged with the outer periphery of a shift drum (not shown) that is rotatably supported by the crankcase 35. The shift drum is rotatably driven by the power generated from a shift driving electric motor 181 (see FIG. 2), which is mounted on the left side surface of the crankcase 35 when the engine body 33 is mounted on the vehicle body frame F.

In addition, the first and second gear covers 116 and 117 may be detachably mounted on the left side surface of the crankcase 35 so as to cover the end of the countershaft 107 of the gear shift mechanism 103. The shift driving electric motor 181 is disposed above first and second gear covers 116 and 117 as shown in FIG. 2, and is disposed on the inside of the outer ends of the first and second gear covers 116 and 117 in the axial direction of the countershaft 107 as shown in FIG. 9. Further, the electric generator cover 87 is mounted on the left side surface of the crankcase 35. However, the shift driving electric motor 181 is disposed on the rear side of the electric generator cover 87, and is mounted on the left side surface of the crankcase 35 while the rotation axis C1 thereof is inclined upward toward the front side as shown in FIG. 2.

Referring to FIG. 2, a water pump 208 is mounted on the left side surface of the crankcase 35 below the electric generator cover 87. First and second oil pumps 209 and 210 and a scavenging pump 211 are received in the crankcase 35 so as to be coaxial with the water pump 208. The first and second oil pumps 209 and 210 and the scavenging pump 211 are driven together with the water pump 208. The rotative power transmitted from the driven gear 129 of the primary speed reduction device 101 is transmitted to the water pump 208, the first and second oil pumps 209 and 210, and the scavenging pump 211 through an endless chain 212. As shown in FIGS. 9 and 10, a driving sprocket 213, which is engaged with the driven gear 129 not to be relatively rotated, is rotatably supported by the first main shaft 105. The chain 212 is wound around the driving sprocket 213 and a driven sprocket 214 that is commonly connected to the water pump 208, the first and second oil pumps 209 and 210, and the scavenging pump 211, and the driving sprocket 213.

Figure 11:
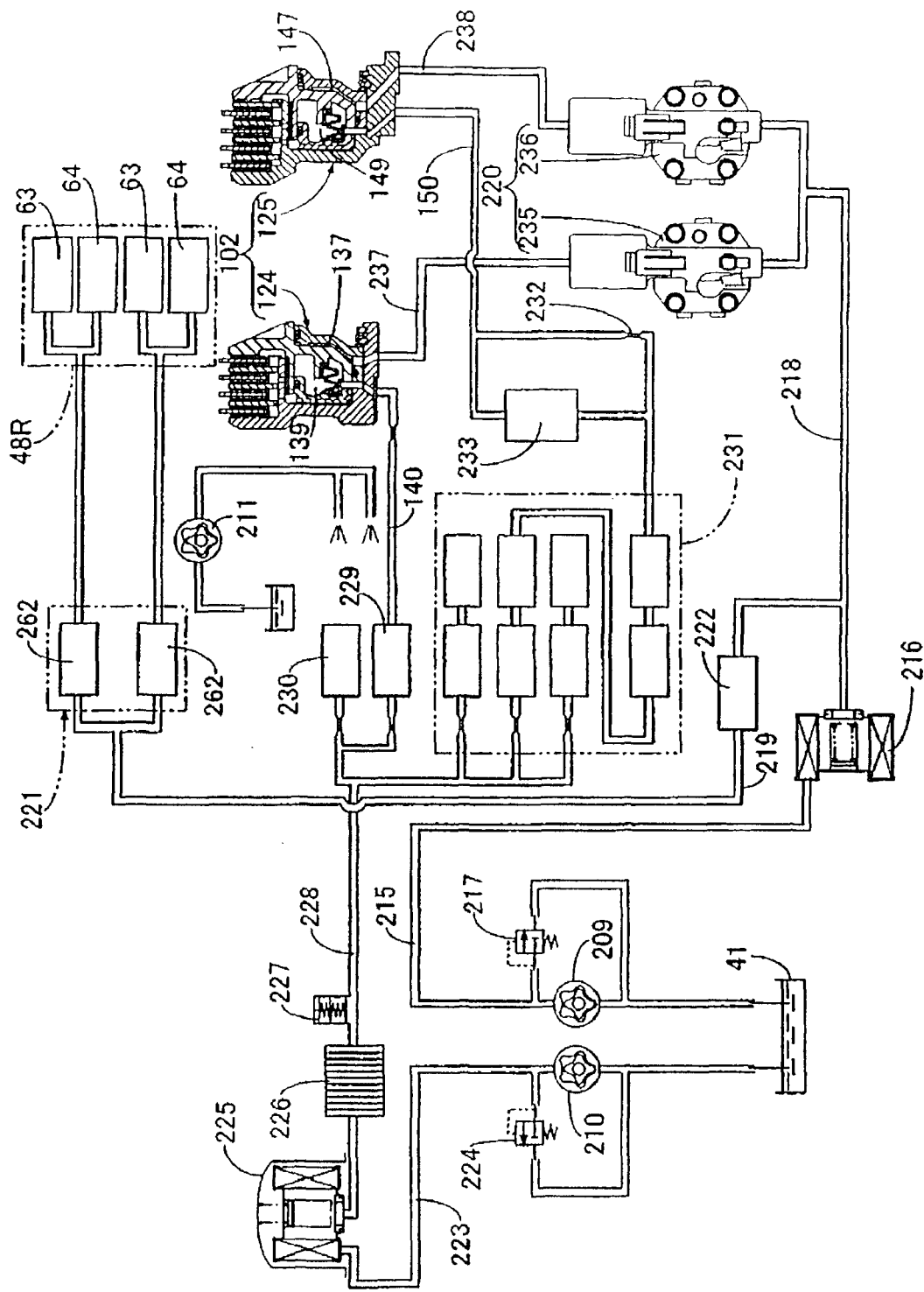
FIG. 11 is a system diagram showing the structure of a hydraulic system.

In FIG. 11, the first oil pump 209 shifts the connection/disconnection of the first and second clutches 124 and 125 of the clutch unit 102, and applies hydraulic pressure that is used to shift the intake and exhaust valve-operation mode changing mechanisms 63 and 64 of the rear-bank valve system 48R. The oil, which is pumped from the oil pan 41 and discharged from the first oil pump 209, is supplied to a first oil filter 216 through an oil passage 215. A relief valve 217 is connected to the oil passage 215. Further, the oil purified in the first oil filter 216 is supplied to and flows in first and second branched oil passages 218 and 219. The first branched oil passage 218 is connected to a clutch control device 220 that shifts the connection/disconnection of the clutch unit 102, and the second branched oil passage 219 is connected to a valve-moving hydraulic pressure control device 221 that shifts the intake and exhaust valve-operation mode changing mechanisms 63 and 64 of the rear-bank valve system 48R. A pressure reducing valve 222 is provided on the second branched oil passage 219.

Further, the second oil pump 210 is used to supply lubricating oil to each lubricating part of an engine E. The oil, which is pumped from the oil pan 41 and discharged from the second oil pump 210, is connected to the second oil filter 225 through an oil passage 223. A relief valve 224 is connected to the middle portion of the oil passage 223. The oil purified in the second oil filter 225 is introduced into an oil passage 228 through the oil cooler 226, and a pressure sensor 227 is connected to the oil passage 228.

The oil supplied from the oil passage 228 is supplied to a lubricating part 229 that is formed around the first and second main shafts 105 and 106 of the gear shift mechanism 103, a lubricating part 230 that is formed around the countershaft 107 of the gear shift mechanism 103, and a plurality of lubricating parts 231 of the engine body 33. In addition, the oil supplied from the lubricating part 229, which is formed around the first and second main shafts 105 and 106 is introduced into the first oil passage 140 that communicates with the canceller chamber 137 of the first clutch 124. Further, the oil supplied from the lubricating part 231 is supplied to the second oil passage 150, which communicates with the canceller chamber 149 of the second clutch 125, through a throttle 232. A solenoid opening-closing valve, which is used to quickly supply oil to the canceller chamber 149, is connected to the throttle 232 in parallel.

Figure 12:
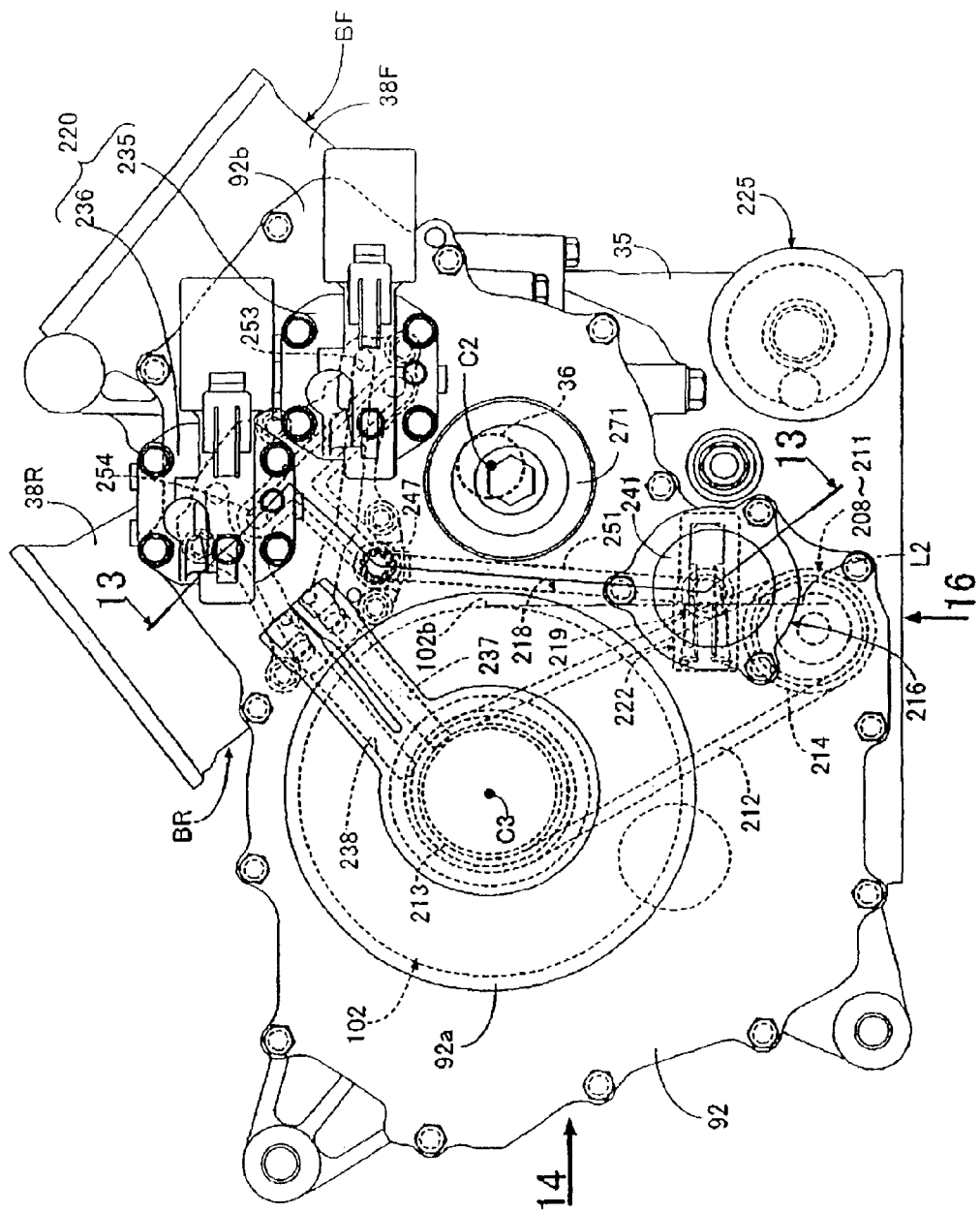
FIG. 12 is an enlarged view of main parts of FIG. 3.
Figure 13:
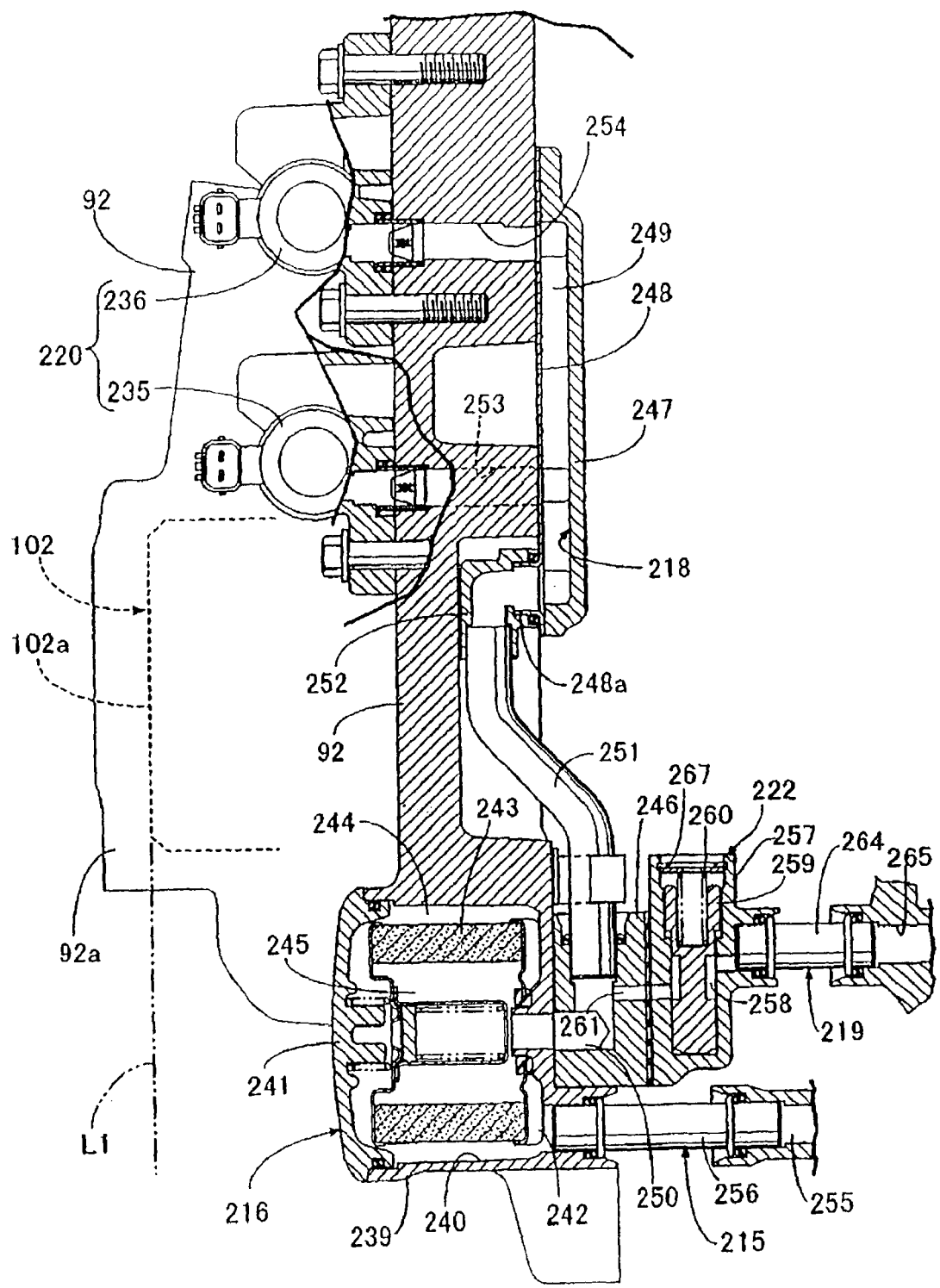
FIG. 13 is a cross-sectional view taken along a line 13-13 of FIG. 12.
Figure 14:
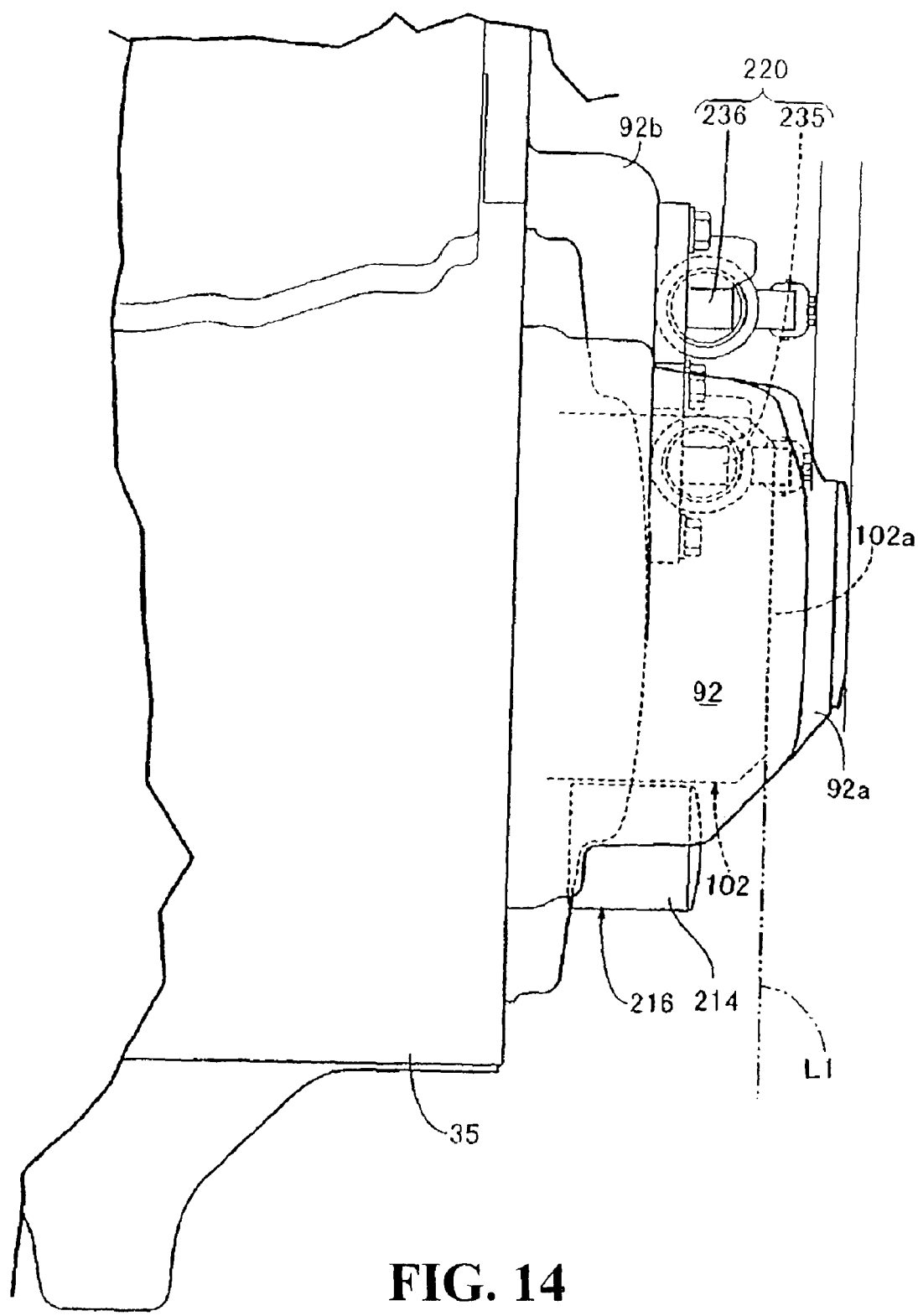
FIG. 14 is a view as seen in a direction of an arrow 14 of FIG. 12.

Referring to FIGS. 12 to 14, the clutch control device 220 includes a first solenoid control valve 235 that shifts the operation and release of the hydraulic pressure with respect to the first hydraulic chamber 137 of the first clutch 124, and a second solenoid control valve 236 that shifts the operation and release of the hydraulic pressure with respect to the second hydraulic chamber 147 of the second clutch 125. The clutch control device is disposed outside the front-bank timing transmission mechanism 95 of the front bank BF, is disposed on the right side of the front cylinder block 38F, is mounted on the outer surface of the clutch cover 92, and is disposed on the outside of the clutch unit 102 as seen in the axial direction of the clutch unit 102 of the front bank BF. That is, the clutch cover 92 is provided with a protrusion 92a that receives the clutch unit 102 at a position corresponding to the clutch unit 102 and protrudes outward, and an extension portion 92b that extends from the protrusion 92a to the right side of the front cylinder block 38F. The clutch control device 220 is mounted on the extension portion 92b.

In addition, as shown in FIG. 12, the first and second solenoid control valves 235 and 236 of the clutch control device 220 are disposed at different positions in the forward, backward, upper, and lower directions. The second solenoid control valve 236 of the first and second solenoid control valves 235 and 236 is disposed above the first solenoid control valve 235 and above the crankshaft 36, and at least a part (in this embodiment, most) of the first solenoid control valve 235 disposed at the lower side is disposed at the front side of the crankshaft 36.

Further, as shown in FIGS. 13 and 14, the clutch unit 102 is positioned on the inside of the outermost end of the clutch cover 92, that is, the tip of the protrusion 92a, so that the clutch unit is mounted on the outer surface of the extension portion 92b of clutch cover 92.

The clutch cover 92 includes an oil passage 237 that connects the first oil passage 154 communicating with the first hydraulic chamber 137 of the first clutch 124 with the first solenoid control valve 235, and an oil passage 238 that connects the second oil passage 157 communicating with the second hydraulic chamber 147 of the second clutch 125 with the second solenoid control valve 236.

Referring to FIG. 12, the first oil filter 216 is disposed at the side of the vehicle body frame F opposite to the side stand 34 in the width direction of the vehicle body frame F. The first oil filter is provided in the clutch cover 92 so as to be disposed between the axis C2 of the crankshaft 36 and the axis C3 of the clutch unit 102 below the axes C2 and C3.

A filter case 239 of the first oil filter 216 protrudes outward from the crankcase 35 of the engine body 33, has a cylindrical shape so as to form a receiving hole 240 having a bottom of which the outer end is opened, and is integrally formed with the clutch cover 92. A lid member 241, which closes the opened outer end of the receiving hole 240, is fastened to the filter case 239.

A cylindrical filtering member 243 is supported by a support frame 242 that is interposed between the closed inner end of the receiving hole 240 and the lid member 241 and is received in the filter case 239. An annular non-purification chamber 244 is formed around the filtering member 243, and a purification chamber 245 is formed in the filtering member 243.

At least a part of the filtering member 243, which is a component of the first oil filter 216, protrudes outward from the outer surface of the clutch cover 92 in the axial direction of the crankshaft 36, is positioned on the inside of the outermost end of the protrusion 92a of the clutch cover 92, and is disposed below the crankshaft 36 and on the outside of the clutch unit 102 as seen in the axial direction of the clutch unit 102, that is, at the front lower side of the clutch unit 102 as shown in FIG. 2 in this embodiment.

Further, as shown in FIG. 12, the first oil filter 216 is provided in the clutch cover 92 so that at least a part of the first oil filter overlaps the water pump 208, the first and second oil pumps 209 and 210, and the scavenging pump 211 in side view.

Meanwhile, as seen in a direction orthogonal to the axes of the crankshaft 36 and the clutch unit 102, as shown in FIGS. 13 and 14, the first oil filter 216 is positioned on the inside of a vertical line L1 that passes through an outer end 102a of the clutch unit 102 in the axial direction. In side view seen in the axial direction of the crankshaft 36 and the clutch unit 102, as shown in FIG. 12, the first oil filter is disposed so that a vertical line L2 passing through the frontmost end 102b of the clutch unit 102 passes through the first oil filter 216. Accordingly, the first oil filter 216 overlaps a part of the clutch unit 102 in plan view, and is disposed on the inside of the outer end 102a of the clutch unit 102 in the axial direction.

A connection member 246 is fastened to the inner surface of the clutch cover 92 at a portion corresponding to the first oil filter 216. Meanwhile, an oil passage forming member 247 is fastened to the inner surface of the clutch cover 92 near the clutch control device 220 with a tabular partition member 248 interposed between the clutch cover 92 and the oil passage forming member. An oil passage 249 is formed between the oil passage forming member 247 and the partition member 248. The connection member 246 forms a connection oil passage 250 that communicates with the purification chamber 245 of the first oil filter 216. One end of a connection pipe 251, which extends toward the oil passage forming member 247 through the correction oil passage 250, is liquid-tightly fitted to the connection member 246. Further, the other end of the connection pipe 251 is fitted to a coupling member 252, and the coupling member 252 is liquid-tightly fitted to a cylindrical fitting tube portion 248a provided in the partition member 248. Further, oil passages 253 and 254, which connect the first and second solenoid control valves 235 and 236 with the oil passage 249 formed between the oil passage forming member 247 and the partition member 248, are formed in the clutch cover 92.

Accordingly, the purification chamber 245 of the first oil filter 216 is connected to the connection oil passage 250, the connection pipe 251, the coupling member 252, the oil passage 249, and the oil passages 253 and 254. The connection oil passage 250, the connection pipe 251, the coupling member 252, the oil passage 249, and the oil passages 253 and 254 form the first branched oil passage 218 that has been described with reference to FIG. 11.

The oil passage 215, which connects the discharge ports of the first oil pump 209 and the non-purification chamber 244 of the first oil filter 216, is composed of an oil passage 255 that communicates with the discharge port of the first oil pump 209 and is formed in the crankcase 35, and a connection pipe 256 that connects the oil passage 255 with the non-purification chamber 244. Both ends of the connection pipe 256 are liquid-tightly fitted to the end of the oil passage 255 and the clutch cover 92.

While interposing the connection member 246 between the inner surface of the clutch cover 92 and itself, a valve housing 257 of the pressure reducing valve 222 is mounted on the clutch cover 92 together with the connection member 246. The pressure reducing valve 222 forms an oil chamber 258 between one end of the valve housing 257 and itself, so that valve body 259 is slidably fitted. A spring 260, which pushes the valve body 259 in a direction where the volume of the oil chamber 258 is decreased, is provided between the valve body 259 and a spring receiving member 267 provided at the other end of the valve housing 257.

A passage 261, which connects the oil chamber 258 with the oil passage 250 of the connection member 246, is formed in the connection member 246 and the valve housing 257. The passage 261 serves as a branch point of the first and second branched oil passages 218 and 219.

When the valve body 259 slidably reciprocates so that the hydraulic force caused by the hydraulic pressure of the oil chamber 258 balances the spring force of the spring 260, the pressure reducing valve 222 constantly reduces the hydraulic pressure of the oil chamber 258. The hydraulic pressure reduced by the pressure reducing valve 222 is introduced to the valve-moving hydraulic pressure control device 221.

Due to the above-mentioned disposition of the pressure reducing valve 222, the pressure reducing valve 222 is disposed directly near the first oil filter 216. In addition, as shown in FIG. 12, as seen in the axial direction of the first oil filter 216, the pressure reducing valve 222 is disposed so that at least a part of the pressure reducing valve overlaps the first oil filter 216.

Referring to FIGS. 2 and 6, the valve-moving hydraulic pressure control device 221 is composed of a pair of solenoid control valves 262 and 262, which individually correspond to each cylinder of the two cylinders of the rear bank BR. The valve-moving hydraulic pressure control device is mounted on the side surface of the engine body 33 on the side opposite to the cam chain 99 of the rear-bank timing transmission mechanism 98 in the axial direction of the intake and exhaust camshafts 57 and 58 of the rear bank BR. In this embodiment, the valve-moving hydraulic pressure control device is mounted on the left side surface of the rear cylinder head 39R of the rear bank BR.

In addition, as shown in FIG. 6, a recess 285, which is recessed inward from the coupling surface 284 between the cylinder block 38R and the cylinder head 39R of the rear bank BR, is formed on the left side surface of the rear cylinder head 39R (corresponding to the ends of the camshafts opposite to the driven sprockets 282). The valve-moving hydraulic pressure control device 221 is mounted on the left side surface of the rear cylinder head 39R so that a part of the valve-moving hydraulic pressure control device is received in the recess 285.

One solenoid control valve 262 controls the hydraulic pressure of the intake and exhaust valve-operation mode changing mechanisms 63 and 64 in one cylinder of the two cylinders. The other solenoid control valve 262 controls the hydraulic pressure of the intake and exhaust valve-operation mode changing mechanisms 63 and 64 in the other cylinder.

Meanwhile, the valve-moving hydraulic pressure control device 221 is mounted on the left side surface of the rear cylinder head 39R on the side opposite to the cam chain 99 of the rear-bank timing transmission mechanism 98. In contrast, the clutch control device 220 is disposed on the right side of the front cylinder block 38F of the front bank BF, and is mounted on the outer surface of the clutch cover 92. The valve-moving hydraulic pressure control device 221 and the clutch control device 220 are disposed on right and left sides of a-center line CB (see FIGS. 4 and 6) of the motorcycle in the width direction of the motorcycle and a center line CP (see FIGS. 4 and 6) of the power unit P in the left and right direction of the power unit.

The shift driving electric motor 181 and clutch control device 220 are disposed on left and right sides of the power unit P. That is, the shift driving electric motor 181 is disposed on the same side as the valve-moving hydraulic pressure control device 221 and below the valve-moving hydraulic pressure control device 221.

Figure 15:
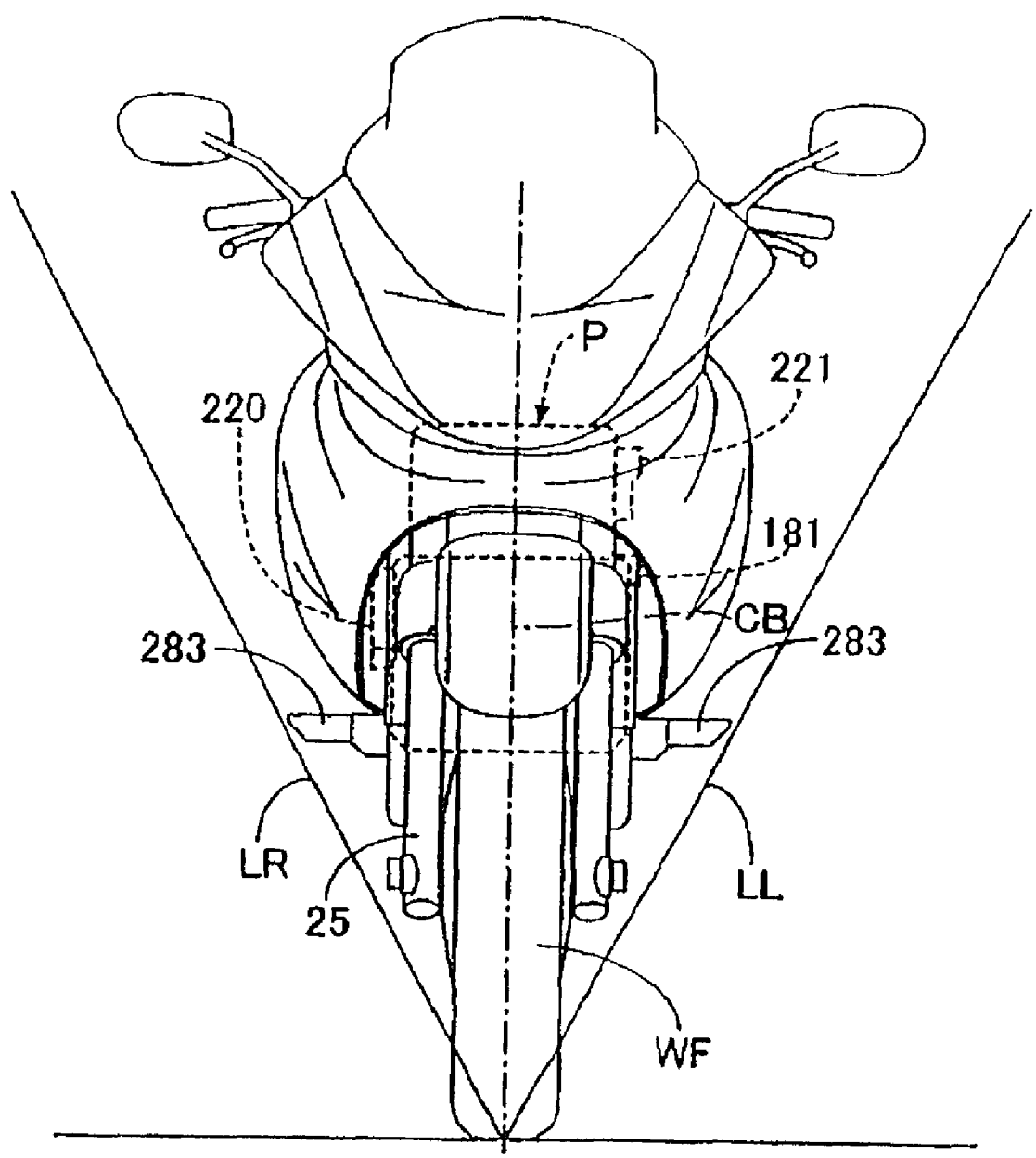
FIG. 15 is a front view as seen in a direction of an arrow 15 of FIG. 1.

Meanwhile, as shown in FIG. 15, the motorcycle includes footrests 283 and 283, which protrude outward, that is, to the left and right sides in front view of the motorcycle, respectively. The footrests 283 protrude outward from the pivot plates 28 of the vehicle body frame F. In addition, in front view, the shift driving electric motor 181, the valve-moving hydraulic pressure control device 221, and the clutch control device 220 are disposed on the inside of the left and right straight lines LL and LR, which connect the outermost ends of both footrests 283 and 283 with a grounded portion of the front wheel WF, respectively.

Further, the shift driving electric motor 181, the valve-moving hydraulic pressure control device 221, and the clutch control device 220 are disposed in a vehicle body cover 286 shown in FIG. 1.

Figure 16:
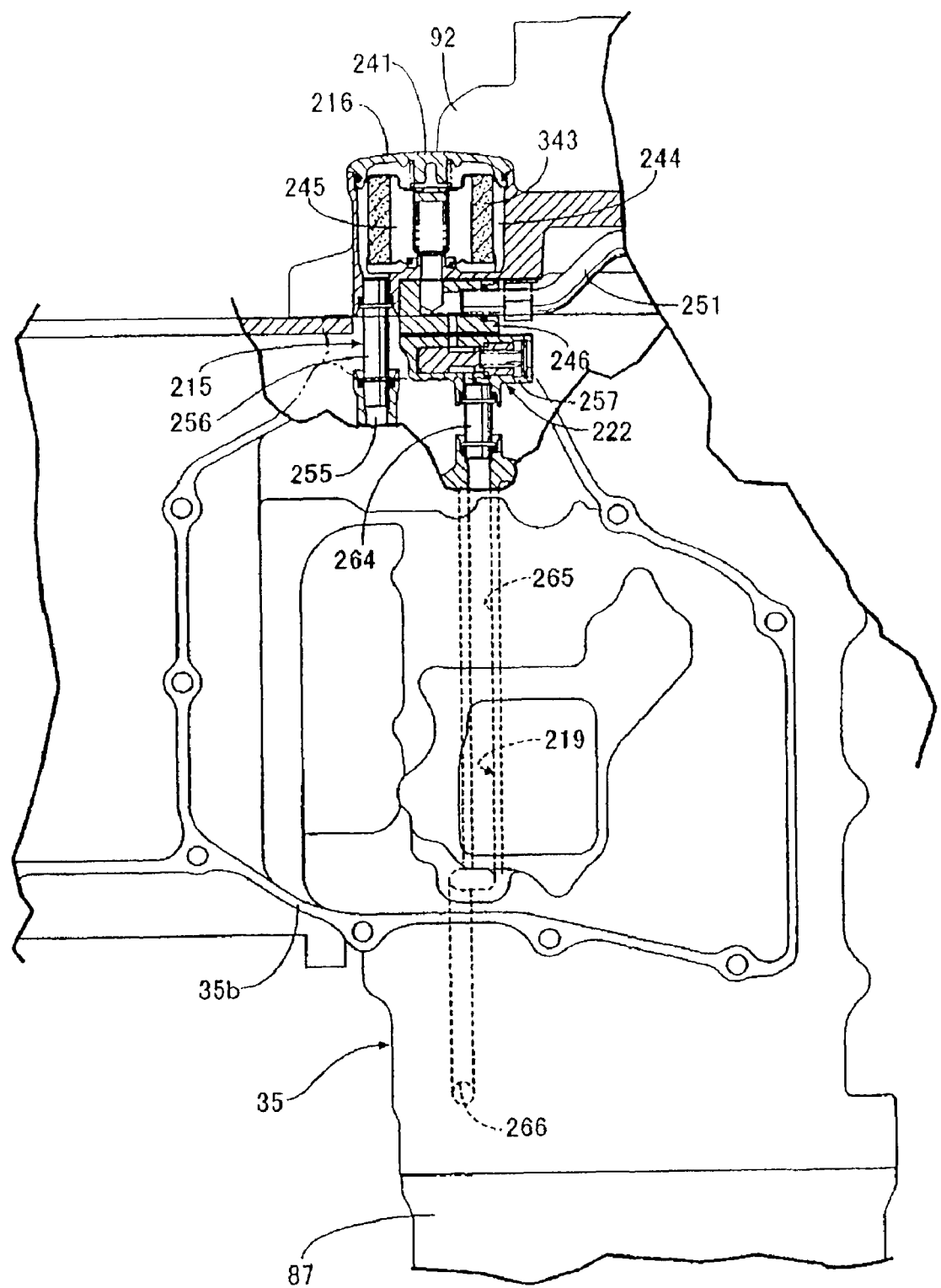
FIG. 16 is a partial cutaway bottom view of a crankcase, as seen in a direction of an arrow 16 of FIG. 12.

Referring to FIGS. 6, 13, and 16, the oil of which pressure is reduced by the pressure reducing valve 222 is introduced to the valve-moving hydraulic pressure control device 221 through a connection pipe 264, an oil passage 265, and an oil passage 266. The connection pipe 264 has one end connected to the valve housing 257, and extends from the clutch cover 92. The oil passage 265 is connected to the other end of the connection pipe 264, and is formed in the crankcase 35 so as to extend parallel to the axial direction of the crankshaft 36 up to the left side surface of the crankcase 35. The oil passage 266 is provided on the left side surface of the rear cylinder head 39R, the rear cylinder block 38R, and the crankcase 35, and connects the oil passage 265 with the valve-moving hydraulic pressure control device 221. The second branched oil passage 219 on which the pressure reducing valve 222 is provided is composed of the connection pipe 264 and the oil passages 265 and 266.

That is, among the connection pipe 264 and the oil passages 265 and 266 that forms at least a part of the first branched oil passage 219 and the oil passage 215 that connects the valve-moving hydraulic pressure control device 221 with the first oil pump 209 (the first branched oil passage 219 in this embodiment), the oil passage 266 is formed on the side of the other end of each of the intake and exhaust camshafts 57 and 58 of the rear bank BR, that is, on the left side surface of the engine body 33 facing the crankcase 35, the rear cylinder block 38R, and the rear cylinder head 39R.

As shown in FIGS. 2 and 6, a part of the oil passage 266 is disposed directly below the valve-moving hydraulic pressure control device 221. A part of the oil passage 266 is formed in the rear cylinder head 39R, the rear cylinder block 38R, and the crankcase 35 so as to overlap the valve-moving hydraulic pressure control device 221 as seen in the axial direction of the cylinder bores 42 formed on the rear cylinder block 38R.

Meanwhile, as shown in FIG. 3, the second oil filter 225 is mounted on the right side surface of the crankcase 35 on the front side of the first oil filter 216.

Next, the operation of this embodiment will be described. The shift driving electric motor 181, which controls the driving of the shift operation of the gear shift mechanism 103, is mounted on the left side surface of the crankcase 35. Accordingly, it is possible to increase the degree of freedom of functional parts in the layout that are disposed around the crankcase 35. The power unit P easily has access to the shift driving electric motor 181 from the outside, so that it is possible to improve the maintainability of the shift driving electric motor 181.

Further, the ends of the countershaft 107 of the gear shift mechanism 103 is covered with the first and second gear covers 116 and 117 that are detachably mounted on the left side surface of the crankcase 35. The shift driving electric motor 181 is mounted on the left side surface of the crankcase 35 so as to be disposed above the first and second gear covers 116 and 117 and to be positioned in the first and second gear covers 116 and 117 in the axial direction of the countershaft 107. Therefore, it is possible to protect the shift driving electric motor 181 and an actuator from stepping stones or muddy water from below by the first and second gear covers 116 and 117. Exclusive parts used to protect the shift driving electric motor 181 do not need to be provided, so that it is possible to reduce the number of parts. For this reason, bosses used to mount a protective cover do not need to be formed around the shift driving electric motor 181, so that it is possible to increase the degree of freedom of other parts in the layout without limiting other parts in the layout that is caused by the bosses.

Further, the electric generator cover 87 is mounted on the left side surface of the crankcase 35, but the shift driving electric motor 181 is positioned on the rear side of the electric generator cover 87 and on the inside of the outer end of the electric generator cover 87 in the axial direction of the crankshaft 36. Accordingly, it is possible to dispose the shift driving electric motor 181 by effectively utilizing a space around the electric generator cover 87 protruding from the left side surface of the crankcase 35. It is possible to prevent the size of the power unit P from being increased in the axial direction of the crankshaft 36 by disposing the shift driving electric motor 181. Furthermore, it is possible to protect the shift driving electric motor 181 from stepping stones or muddy water from the front side by the electric generator cover 87. Exclusive parts used to protect the shift driving electric motor 181 do not need to be provided, so that it is possible to reduce the number of parts. For this reason, bosses used to mount a protective cover do not need to be formed around the shift driving electric motor 181, so that it is possible to increase the degree of freedom of other parts in the layout without limiting other parts in the layout that is caused by the bosses.

Since the rotation axis C1 of the shift driving electric motor 181 is inclined in a vertical direction, the electric generator cover 87 provided on the front side does not cause interference when the shift driving electric motor 181 is attached or detached. For this reason, it is possible to improve maintainability.

The clutch cover 92 that receives the clutch unit 102 is mounted on the right side surface of the crankcase 35, and the clutch control device 220, which shifts and controls the connection/disconnection of the clutch unit 102, is mounted on the outer surface of the clutch cover 92 so as to be disposed on the right side of the front cylinder block 38F of the front bank BF. Accordingly, traveling wind easily comes in contact with the clutch control device 220, so that cooling performance can be improved. Further, it is possible to prevent the length of the engine body 33 from being increased in a forward and backward direction. In addition, a relatively small quantity of vehicle body components, such as intake parts or the vehicle body frame F, is disposed at a portion corresponding to the outer surface of the clutch cover 92. Therefore, it is possible to increase the degree of freedom in design of intake parts or the vehicle body frame F by mounting the clutch control device 220 on the outer surface of the clutch cover 92.

Further, the clutch unit 102 has a twin type structure that includes the first and second clutches 124 and 125, and the clutch control device 220 includes the first and second solenoid control valves 235 and 236 that individually control the connection/disconnection of the first and second clutches 124 and 125. Furthermore, since the first and second solenoid control valves 235 and 236 are disposed at different positions in the forward, backward, upper, and lower directions, each of the first and second solenoid control valves 235 and 236 easily comes in contact with traveling wind. Therefore, it is possible to obtain excellent cooling performance.

In addition, the second solenoid control valve 236 of the first and second solenoid control valves 235 and 236 is disposed above the first solenoid control valve 235 and above the crankshaft 36, and at least a part (in this embodiment, most) of the first solenoid control valve 235 is disposed at the front side of the crankshaft 36. Accordingly, the clutch control device 220 can be disposed in a space that is formed from the upper side of the crankshaft 36 to the front side thereof and is larger than the space between the crankshaft 36 and the clutch unit 102, a distance between the axes of the crankshaft 36 and the clutch unit 102 can be decreased, and traveling wind can also easily come in contact with the first and second solenoid control valves 235 and 236.

Since the clutch control device 220 is disposed on the inside of the outermost end of the clutch cover 92, it is possible to prevent the clutch control device 220 from protruding to the right side of the crankcase 35 as much as possible, and a bank angle corresponding to the disposition of the clutch control device 220 does not need to be considered.

In addition, the clutch control device 220 is disposed on the outside of the clutch unit 102 as seen in the axial direction of the clutch unit 102. Accordingly, it is possible to suppress the increase in the size of the power unit P in the left and right direction as much as possible by mounting the clutch control device 220 on the outer surface of the clutch cover 92 while avoiding the clutch unit 102 that most protrudes to the right side of the crankcase 35.

Further, the oil passages 237 and 238, which connect the hydraulic clutch unit 102 with the clutch control device 220 for controlling the hydraulic pressure applied to the clutch unit 102, are formed on the clutch cover 92. Therefore, it is possible to make the oil passages 237 and 238 short and simple and to improve maintainability of the mechanism for controlling the clutch unit 102.

Meanwhile, the clutch cover 92 is provided with the first oil filter 216, and the first oil filter 216 is disposed between the axis of the crankshaft 36 and the axes C2 and C3 of the clutch unit 102 below the axes C2 and C3. Accordingly, it is possible to dispose the first oil filter 216 by effectively utilizing a space that is formed between the crankshaft 36 and the clutch unit 102 below the crankshaft and the clutch unit, and to ensure the degree of freedom in design of parts positioned above the crankshaft 36, such as the inner diameter of the cylinder bore 42 that is positioned above the crankshaft 36 or the disposition of the timing transmission mechanisms 95 and 98. In addition, since there is a spatial margin in the engine body 33 on the lower side between the axis C2 of the crankshaft 36 and the axis C3 of the clutch unit 102, it is possible to suppress the protrusion of the first oil filter 216 in the axial direction of the crankshaft 36 without limiting the degree of freedom of the disposition of the other parts. Further, the first oil filter 216 is disposed below the crankshaft 36, so that it is possible to lower the center of gravity of the motorcycle.

Furthermore, since the first oil filter 216 is disposed on the inside of the outer end 102a of the clutch unit 102 in the axial direction so as to overlap a part of the clutch unit 102 in plan view, it is possible to avoid the increase in the size of the power unit P in the axial direction of the crankshaft 36 by mounting the first oil filter 216 and to prevent a bank angle from being affected by the protrusion of the first oil filter 216 from the clutch cover 92.

Further, the first oil filter 216 makes at least a part of the filtering member 243, which is a component of the first oil filter 216, protrude outward from the outer surface of the clutch cover 92 in the axial direction of the crankshaft 36, and is disposed below the crankshaft 36 and on the outside of the clutch unit 102 as seen in the axial direction of the clutch unit 102. Therefore, traveling wind easily comes in contact with the first oil filter 216, so that cooling performance of the first oil filter 216 can be improved.

In addition, the first oil filter 216 is disposed so that a part of the first oil filter overlaps the water pump 208, the first and second oil pumps 209 and 210, and the scavenging pump 211 in side view. Therefore, the first oil pump 209 and the first oil filter 216 are disposed close to each other. As a result, it is possible to make the oil passage 215, which connects the first oil pump 209 with the first oil filter 216, short and simple.

Further, the oil passages 237 and 238, which connect the clutch unit 102 with the clutch control device 220 for controlling the hydraulic pressure applied to the clutch unit 102, are formed on the clutch cover 92. Therefore, the oil passages 237 and 238, which connect the clutch control device 220, the clutch unit 102, and the clutch control device 220, are intensively formed in the clutch cover 92. As a result, it is possible to make the oil passages 237 and 238 short and simple and to improve maintainability of the mechanism for controlling the clutch unit 102.

Furthermore, the first oil filter 216 is disposed at the side of the vehicle body frame F opposite to the side stand 34 in the width direction of the vehicle body frame F. Therefore, it is possible to improve the maintainability of the first oil filter 216 when the motorcycle is parked while the side stand 34 stands.

In addition, the pressure reducing valve 222 is provided on the second branched oil passage 219 that connects the first oil filter 216 with the valve-moving hydraulic pressure control device 221. However, since the pressure reducing valve 222 is disposed directly near the first oil filter 216, it is possible to efficiently use necessary hydraulic pressure and to compactly dispose the pressure reducing valve 222 and the first oil filter 216.

Further, the substantially cylindrical filter case 239 of the first oil filter 216 is mounted on the crankcase 35 so as to protrude outward from the crankcase 35, and at least a part of the pressure reducing valve 222 overlaps the first oil filter 216 as seen in the axial direction of the filter case 239. Therefore, the pressure reducing valve 222 and the first oil filter 216 can be disposed closer to each other, and it is possible to make the power unit P compact.

Furthermore, since the first oil filter 216 and the pressure reducing valve 222 are provided in the clutch cover 92 mounted on the crankcase 35, it is possible to improve an assembling property. In addition, it is easy to manufacture the power unit P that includes the pressure reducing valve 222 and the first oil filter 216, and the power unit that does not include a pressure reducing valve and an oil filter, by the same engine body 33.

In addition, the discharge port of the first oil pump 209 is commonly connected to the intake and exhaust valve-operation mode changing mechanisms 63 and 64 and the clutch unit 102. Accordingly, it is possible to suppress the increase in the bulk of the power unit P, and to make the hydraulic system, which is related to the intake and exhaust valve-operation mode changing mechanisms 63 and 64 and the clutch unit 102, compact, thereby providing a power unit P suitable for a motorcycle.

The pressure reducing valve 222 is provided on the second branched oil passage 219 of the first and second branched oil passages 218 and 219, which are branched from the first oil pump 209 and connected to the clutch control device 220 and the valve-moving hydraulic pressure control device 221. Therefore, hydraulic pressure, which is suitable for the clutch control device 220 and the valve-moving hydraulic pressure control device 221, can be applied to the clutch control device and the valve-moving hydraulic pressure control device, so that it is possible to appropriately and efficiently organize a hydraulic system.

In addition, the intake and exhaust valve-operation mode changing mechanisms 63 and 64 can perform a shift operation with hydraulic pressure lower than the hydraulic pressure of the clutch unit 102. The intake and exhaust valve-operation mode changing mechanisms reduces the hydraulic pressure of the oil, which is discharged from the first oil pump 209, by the pressure reducing valve 222, and then provides the reduced hydraulic pressure. Therefore, it is possible to apply the hydraulic pressure, which is suitable for the mechanisms and the unit, to the intake and exhaust valve-operation mode changing mechanisms 63 and 64 and the clutch unit 102, respectively.

The valve-moving hydraulic pressure control device 221, which controls the hydraulic pressure applied to the intake and exhaust valve-operation mode changing mechanisms 63 and 64 of the rear-bank valve system 48R of the rear bank BR, is mounted on the side surface of the rear cylinder head 39R of the engine body 33 opposite to the cam chain 99 of the rear-bank timing transmission mechanism 98 in the axial direction of the intake and exhaust camshafts 57 and 58 of the rear-bank valve system 48R. Accordingly, when the intake and exhaust valve-operation mode changing mechanisms 63 and 64 and the valve-moving hydraulic pressure control device 221 are connected to each other by the oil passages, it is not necessary to avoid the path of the cam chain 99 and it is possible to increase the degree of freedom in disposing the oil passage. In addition, it is possible to directly connect the oil passage to the rear cylinder head 39R of the engine body 33, and to suppress the increase in the number of parts and assembly man-hours.

Further, a recess 285, which is recessed inward from the coupling surface 284 of the rear cylinder block 38R on the side of the engine having the end of each camshaft opposite to the cam chain 99, is formed on the left side surface of the rear cylinder head 39R on the side of the engine having the end of each camshaft. The valve-moving hydraulic pressure control device 221 is mounted on the side surface of the rear cylinder head 39R so that a part of the valve-moving hydraulic pressure control device is received in the recess 285. It is possible to suppress the increase in the bulk of the engine E that includes the valve-moving hydraulic pressure control device 221 by mounting the valve-moving hydraulic pressure control device 221 on the engine body 33, thereby making the engine E compact.

Further, the oil passage 266 of the second branched oil passage 219 of the oil passage 215 and the second branched oil passage 219, which connect the valve-moving hydraulic pressure control device 221 with the first oil pump 209, is formed in the engine body 33 on the side of the other end of each of the intake and exhaust camshafts 57 and 58, that is, on the side of the end of each camshaft opposite to the cam chain 99. Therefore, it is possible to simplify the structure of the oil passage that introduces oil into the valve-moving hydraulic pressure control device 221 from the first oil pump 109, and to suppress the increase in the number of parts and processing man-hours.

Furthermore, a part of the oil passage 266 connected to the valve-moving hydraulic pressure control device 221 is formed in the rear cylinder head 39R, the rear cylinder block 38R, and the crankcase 35 on the side closer to the crankshaft 36 than the recess 285 so as to overlap the valve-moving hydraulic pressure control device 221 as seen in the axial direction of the cylinder bores 42 formed on the rear cylinder block 38R. Accordingly, it is possible to efficiently dispose the oil passage connected to the valve-moving hydraulic pressure control device 221.

Meanwhile, the valve-moving hydraulic pressure control device 221 that controls the operation of the intake and exhaust valve-operation mode changing mechanisms 63 and 64 provided in the rear-bank valve system 48R, and the clutch control device 220 that shifts the connection/disconnection of the clutch unit 102 provided between the crankshaft 36 and the gear shift mechanism 103 by shifting the connection/disconnection of the power transmission, are respectively disposed on right and left sides of the center line CB of the vehicle in the width direction of the vehicle and respectively on the right and left sides of the center line CP of the power unit P in the left and right directions of the power unit P. Accordingly, it is possible to make the center of gravity of the power unit P be balanced in the left and right directions, to make the power unit P compact, and to easily mount the power unit P on the motorcycle.

In addition, in front view of the motorcycle, the valve-moving hydraulic pressure control device 221 and the clutch control device 220 are disposed respectively on the inside of the left and right straight lines LL and LR that connect the outermost ends of the footrests 283 protruding toward the left and right sides with the grounded portion of the front wheel WF in front view. When the motorcycle is tilted toward the left or right side, it is possible to protect the valve-moving hydraulic pressure control device 221 and the clutch control device 220 by the footrests 283.

In addition, the oil passage 266, which introduces hydraulic pressure from the first oil pump 209, is formed in one (in this embodiment, the valve-moving hydraulic pressure control device 221) of the valve-moving hydraulic pressure control device 221 and the clutch control device 220, on the side of the other end of each of the intake and exhaust camshafts 57 and 58 of the rear bank BR, that is, on the side of the left side surface of the engine body 33 facing the crankcase 35, the rear cylinder block 38R, and the rear cylinder head 39R. Accordingly, it is possible to make the hydraulic system, which is related to the hydraulic intake and exhaust valve-operation mode changing mechanisms 63 and 64 and the clutch unit 102, compact, thereby providing a power unit P suitable for a motorcycle.

Further, the oil passage 265, which forms a part of the second branched oil passage 219 of the oil passage 215 introducing hydraulic pressure from the first oil pump 209 and second branched oil passage 219, is formed in one (in this embodiment, the valve-moving hydraulic pressure control device 221) of the valve-moving hydraulic pressure control device 221 and the clutch control device 220, so as to extend in the axial direction of the crankshaft 36. Accordingly, it is possible to reduce an influence on the balance of the center of gravity by the disposition of the oil passage 265.

Furthermore, the shift driving electric motor 181 and the valve-moving hydraulic pressure control device 221 are disposed on the side opposite to the clutch control device 220 in the left and right direction, and the shift driving electric motor 181 is disposed below the valve-moving hydraulic pressure control device 221. Accordingly, it is possible to dispose the clutch control device 220, the shift driving electric motor 181, and the valve-moving hydraulic pressure control device 221 with excellent weight balance and space efficiency. In addition, since the clutch control device 220, the shift driving electric motor 181, and the valve-moving hydraulic pressure control device 221 are disposed in the vehicle body cover 286, it is possible to protect the clutch control device 220, the shift driving electric motor 181, and the valve-moving hydraulic pressure control device 221.

The embodiment of the invention has been described above. However, the invention is not limited to the embodiment, and may have various modifications without departing from the scope of the invention described in claims.

For example, the cylinder blocks 38F and 38R have been integrally formed with the upper half case 35a of the crankcase 35 in the embodiment, but cylinder blocks that are individual bodies separated from the crankcase may be fastened to the crankcase.

We claim:

1. A saddle-riding type vehicle, comprising:
a power unit mounted on a vehicle body frame, said power unit comprising:
   a valve system provided with valve-operation mode changing mechanisms for changing operation modes of engine valves between a state where the engine valves are opened and closed and a state where the engine valves are closed and pause,
   a clutch unit provided between a crankshaft and a shift mechanism for shifting the connection/disconnection of power transmission,
   a valve control device that controls operation of said valve-operation mode changing mechanisms, and
   a clutch control device that controls operation of said clutch unit,
wherein said valve control device and said clutch control device are respectively entirely disposed on left and right sides of a center line of said vehicle in a width direction of said vehicle.

2. The saddle-riding type vehicle according to claim 1,
wherein a single oil pump is commonly connected to said valve control device and said clutch control device to hydraulically actuate said valve control device and said clutch control device; and
wherein at least a part of an oil passage, that introduces hydraulic pressure from said single oil pump to said valve control device and said clutch control device, extends in the axial direction of said crankshaft.

3. A motorcycle, comprising:
a power unit mounted on a vehicle body frame, said power unit comprising:
   a valve system provided with valve-operation mode changing mechanisms for changing operation modes of engine valves between a state where the engine valves are opened and closed and a state where the engine valves are closed and pause,
   a clutch unit provided between a crankshaft and a shift mechanism for shifting the connection/disconnection of power transmission,
   a valve control device that controls operation of said valve-operation mode changing mechanisms, and
   a clutch control device that controls operation of said clutch unit,
wherein said valve control device and said clutch control device are respectively entirely disposed on left and right sides of a center line of said motorcycle in a width direction of said motorcycle, and
wherein said valve control device and said clutch control device are respectively disposed inside of left and right straight lines that connect a grounded portion of a front wheel of said motorcycle with outermost ends of footrests protruding toward the left and right sides of said motorcycle, in front view.

4. The motorcycle according to claim 3,
wherein a single oil pump is commonly connected to said valve control device and said clutch control device to hydraulically actuate said valve control device and said clutch control device; and
wherein at least a part of an oil passage, that introduces hydraulic pressure from said single oil pump to said valve control device and said clutch control device, extends in the axial direction of said crankshaft.

5. A saddle-riding type vehicle, comprising:
a power unit mounted on a vehicle body frame, said power unit comprising:
   a valve system provided with valve-operation mode changing mechanisms for changing operation modes of engine valves between a state where the engine valves are opened and closed and a state where the engine valves are closed and pause,
   a clutch unit provided between a crankshaft and a shift mechanism for shifting the connection/disconnection of power transmission,
   a valve control device that controls operation of said valve-operation mode changing mechanisms, and
   a clutch control device that controls operation of said clutch unit,
wherein said power unit is mounted on said vehicle body frame such that an axial direction of said crankshaft corresponds to the left and right direction of said vehicle; and
wherein said valve control device and said clutch control device are respectively entirely disposed on left and right sides of a center line of said power unit in a left and right direction of said power unit.

6. The saddle-riding type vehicle according to claim 5,
wherein a single oil pump is commonly connected to said valve control device and said clutch control device to hydraulically actuate said valve control device and said clutch control device; and
wherein at least a part of an oil passage, that introduces hydraulic pressure from said single oil pump to said valve control device and said clutch control device, extends in the axial direction of said crankshaft.

* * * * *